US012568422B2

(12) United States Patent
Balasubramanian et al.

(10) Patent No.: US 12,568,422 B2
(45) Date of Patent: Mar. 3, 2026

(54) TECHNIQUES FOR ACCESS LINK BASED RELIABILITY FOR SIDELINK COMMUNICATIONS

(71) Applicant: QUALCOMM Incorporated, San Diego, CA (US)

(72) Inventors: Anantharaman Balasubramanian, San Diego, CA (US); Shuanshuan Wu, San Diego, CA (US)

( * ) Notice: Subject to any disclaimer, the term of this patent is extended or adjusted under 35 U.S.C. 154(b) by 321 days.

(21) Appl. No.: 18/335,873

(22) Filed: Jun. 15, 2023

(65) Prior Publication Data

US 2024/0422649 A1     Dec. 19, 2024

(51) Int. Cl.
*H04W 40/22*     (2009.01)
*H04W 40/20*     (2009.01)
*H04W 64/00*     (2009.01)

(52) U.S. Cl.
CPC ........... *H04W 40/22* (2013.01); *H04W 40/20* (2013.01); *H04W 64/00* (2013.01)

(58) Field of Classification Search
CPC ..... H04W 40/22; H04W 40/20; H04W 64/00; H04W 4/023; H04W 4/021
See application file for complete search history.

(56) References Cited

U.S. PATENT DOCUMENTS

| | | | | |
|---|---|---|---|---|
| 2020/0092685 A1* | 3/2020 | Fehrenbach | .......... | H04W 36/08 |
| 2020/0267692 A1* | 8/2020 | Wu | ....................... | H04W 72/04 |
| 2020/0412490 A1* | 12/2020 | Ryu | ..................... | H04L 1/1819 |
| 2021/0050954 A1* | 2/2021 | Ryu | ........................ | H04W 4/40 |

| | | | | |
|---|---|---|---|---|
| 2021/0112445 A1* | 4/2021 | Wu | ........................ | H04W 28/04 |
| 2021/0144606 A1* | 5/2021 | Xu | .......................... | H04W 76/30 |
| 2022/0167345 A1* | 5/2022 | Jeong | .................... | H04W 72/54 |
| 2022/0311583 A1* | 9/2022 | Ye | ........................... | H04W 72/20 |
| 2022/0353856 A1* | 11/2022 | Luo | ..................... | H04W 72/044 |
| 2023/0040305 A1* | 2/2023 | Kimba Dit Adamou | .................... | H04W 40/20 |
| 2023/0284298 A1* | 9/2023 | Kumar | .................... | H04W 4/12 370/329 |
| 2023/0300713 A1 | 9/2023 | Hoang et al. | | |
| 2024/0023143 A1* | 1/2024 | Wang | .................... | H04W 72/21 |
| 2024/0089875 A1* | 3/2024 | Zorgui | ............. | H04W 52/0206 |

(Continued)

FOREIGN PATENT DOCUMENTS

| | | | | |
|---|---|---|---|---|
| EP | 3373605 A1 | 9/2018 | | |
| WO | WO-2018172857 A1 * | 9/2018 | ............ | H04W 72/20 |

OTHER PUBLICATIONS

International Search Report and Written Opinion—PCT/US2024/033283—ISA/EPO—Sep. 19, 2024 (2300175WO).

*Primary Examiner* — Ivan O Latorre

(57) ABSTRACT

Methods, systems, and devices for method for wireless communication are described. A serving network entity may receive, from a user equipment (UE) and via an access link, a distance-based sidelink message including an indication of a region of interest around the UE. In some examples, the distance-based sidelink message may be for relay of the distance-based sidelink message to one or more UEs within the region of interest. The serving network entity may select one or more target network entities that provide service to at least a portion of the region of interest around the UE. The serving network entity may then transmit, via a backhaul link, the distance-based sidelink message to the one or more target network entities for relay of the distance-based sidelink message to one or more UEs within the region of interest.

30 Claims, 18 Drawing Sheets

(56)     References Cited

U.S. PATENT DOCUMENTS

2024/0121659 A1 *   4/2024   Chen ..................... H04W 76/14
2024/0305358 A1 *   9/2024   Yang ................. H04B 7/15542
2024/0422649 A1 *  12/2024   Balasubramanian .......................
                                            H04W 4/023

* cited by examiner

510

520

515

505

500

130

105

115

Network Entity

Transceiver

810

Antenna

815

Communications Manager

820

Memory

Code

830

825

840

Processor

835

805

800

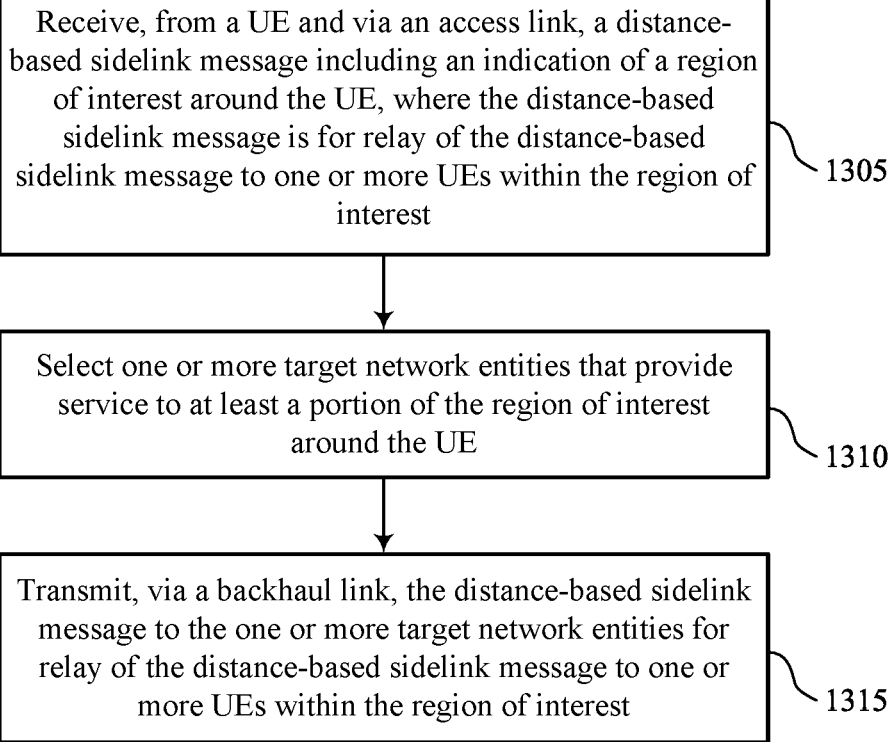

Receive, from a UE and via an access link, a distance-based sidelink message including an indication of a region of interest around the UE, where the distance-based sidelink message is for relay of the distance-based sidelink message to one or more UEs within the region of interest   1305

Select one or more target network entities that provide service to at least a portion of the region of interest around the UE   1310

Transmit, via a backhaul link, the distance-based sidelink message to the one or more target network entities for relay of the distance-based sidelink message to one or more UEs within the region of interest   1315

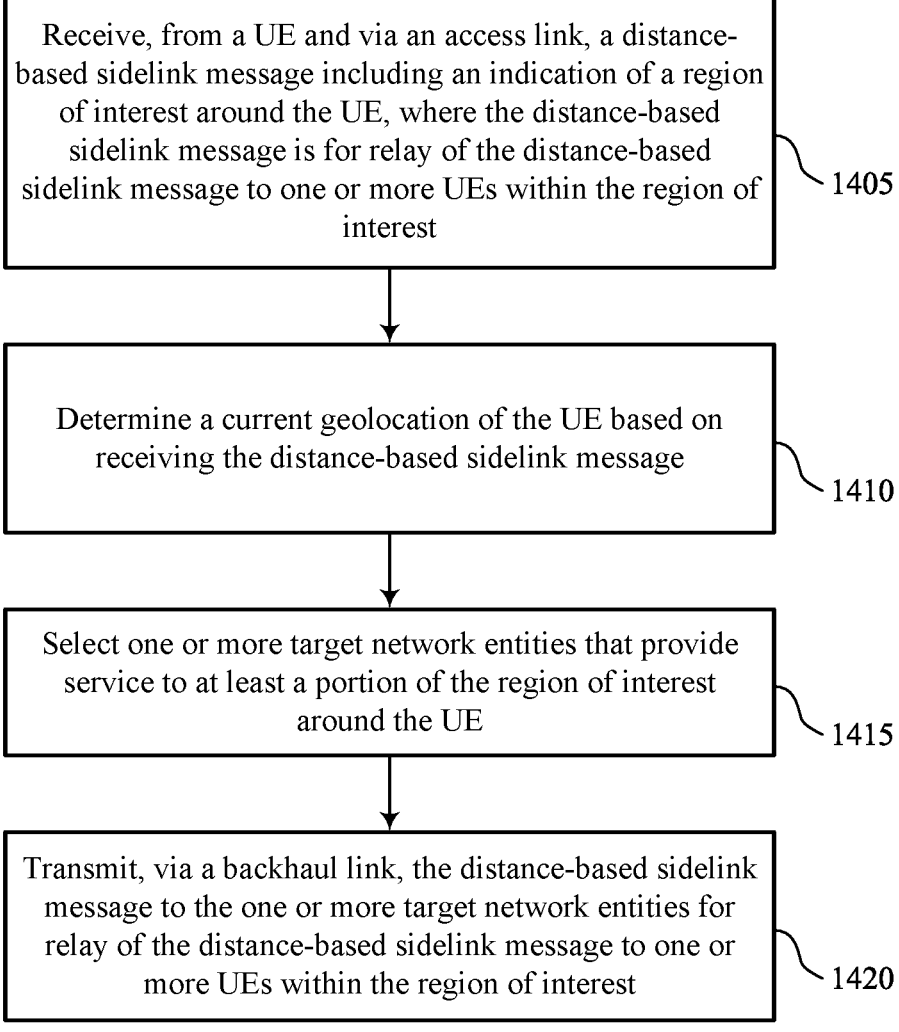

Receive, from a UE and via an access link, a distance-based sidelink message including an indication of a region of interest around the UE, where the distance-based sidelink message is for relay of the distance-based sidelink message to one or more UEs within the region of interest ⌐ 1405

Determine a current geolocation of the UE based on receiving the distance-based sidelink message ⌐ 1410

Select one or more target network entities that provide service to at least a portion of the region of interest around the UE ⌐ 1415

Transmit, via a backhaul link, the distance-based sidelink message to the one or more target network entities for relay of the distance-based sidelink message to one or more UEs within the region of interest ⌐ 1420

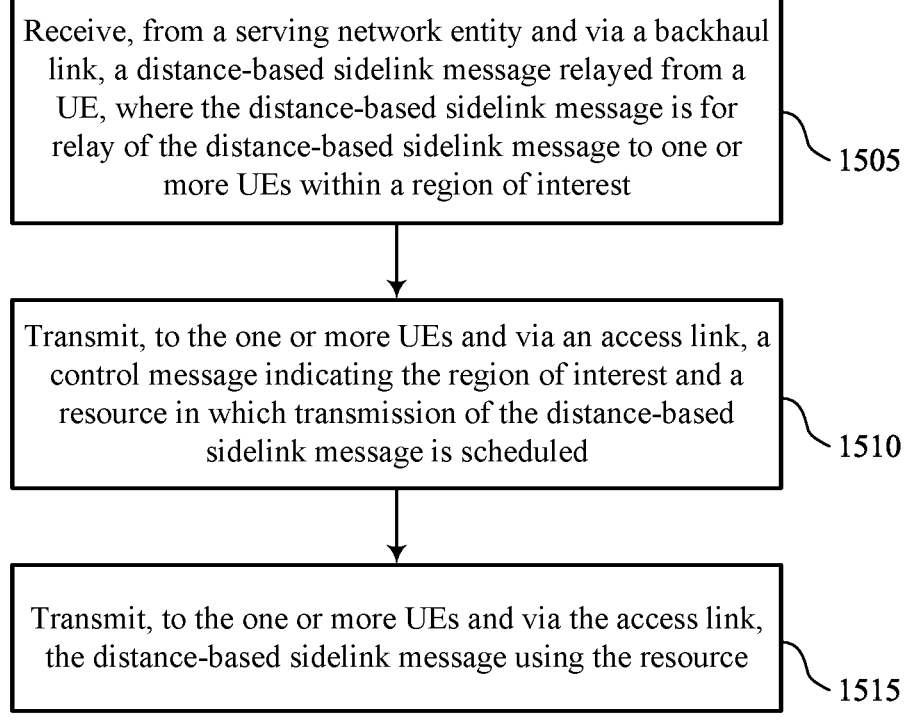

Receive, from a serving network entity and via a backhaul link, a distance-based sidelink message relayed from a UE, where the distance-based sidelink message is for relay of the distance-based sidelink message to one or more UEs within a region of interest

1505

Transmit, to the one or more UEs and via an access link, a control message indicating the region of interest and a resource in which transmission of the distance-based sidelink message is scheduled

1510

Transmit, to the one or more UEs and via the access link, the distance-based sidelink message using the resource

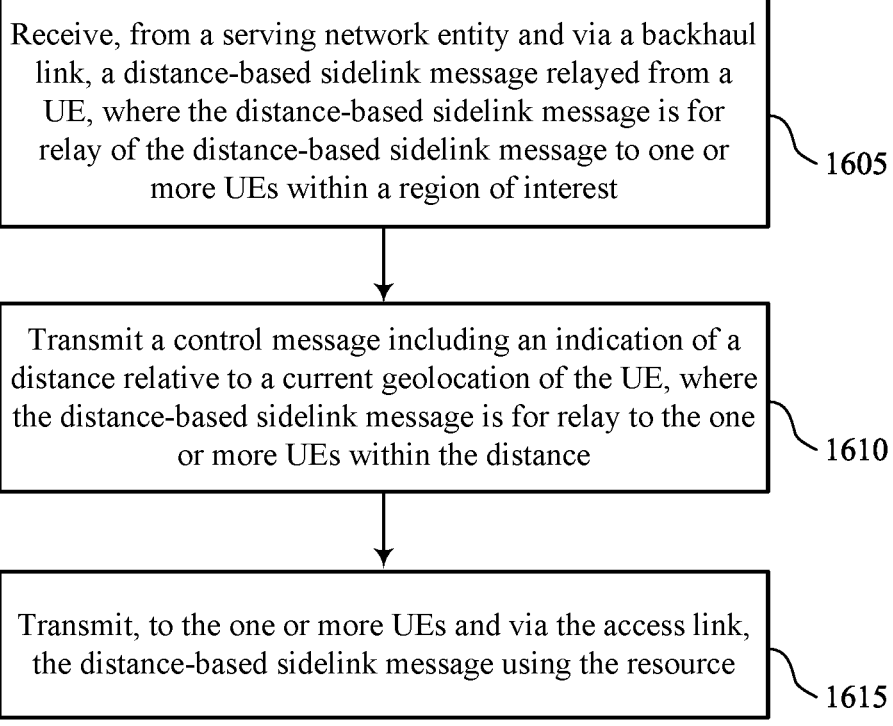

Receive, from a serving network entity and via a backhaul link, a distance-based sidelink message relayed from a UE, where the distance-based sidelink message is for relay of the distance-based sidelink message to one or more UEs within a region of interest

1605

Transmit a control message including an indication of a distance relative to a current geolocation of the UE, where the distance-based sidelink message is for relay to the one or more UEs within the distance

1610

Transmit, to the one or more UEs and via the access link, the distance-based sidelink message using the resource

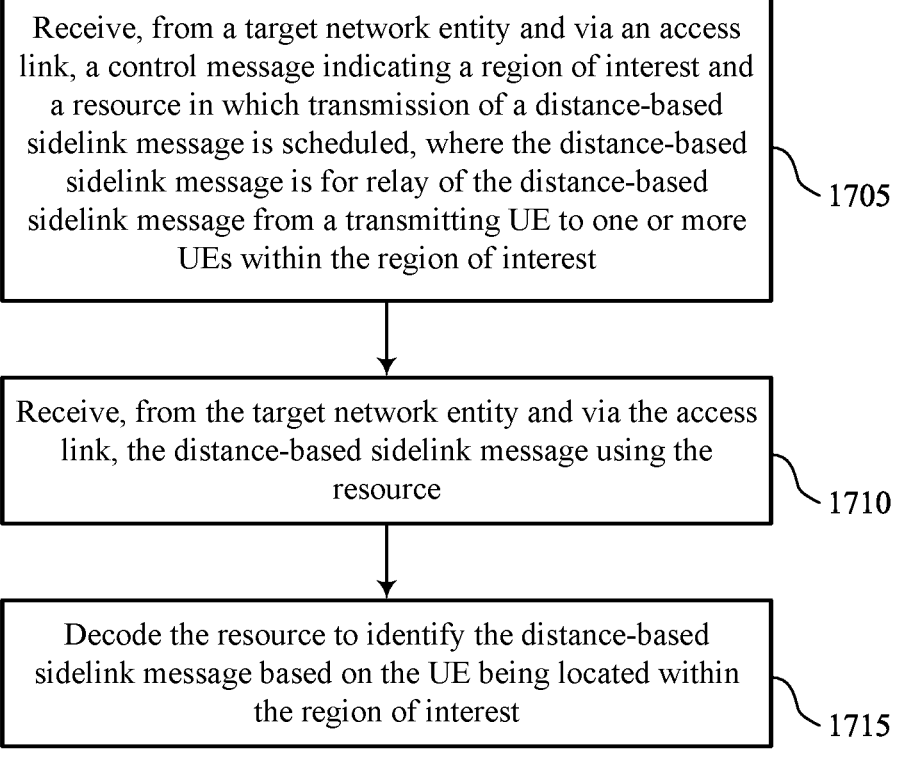

Receive, from a target network entity and via an access link, a control message indicating a region of interest and a resource in which transmission of a distance-based sidelink message is scheduled, where the distance-based sidelink message is for relay of the distance-based sidelink message from a transmitting UE to one or more UEs within the region of interest

1705

Receive, from the target network entity and via the access link, the distance-based sidelink message using the resource

1710

Decode the resource to identify the distance-based sidelink message based on the UE being located within the region of interest

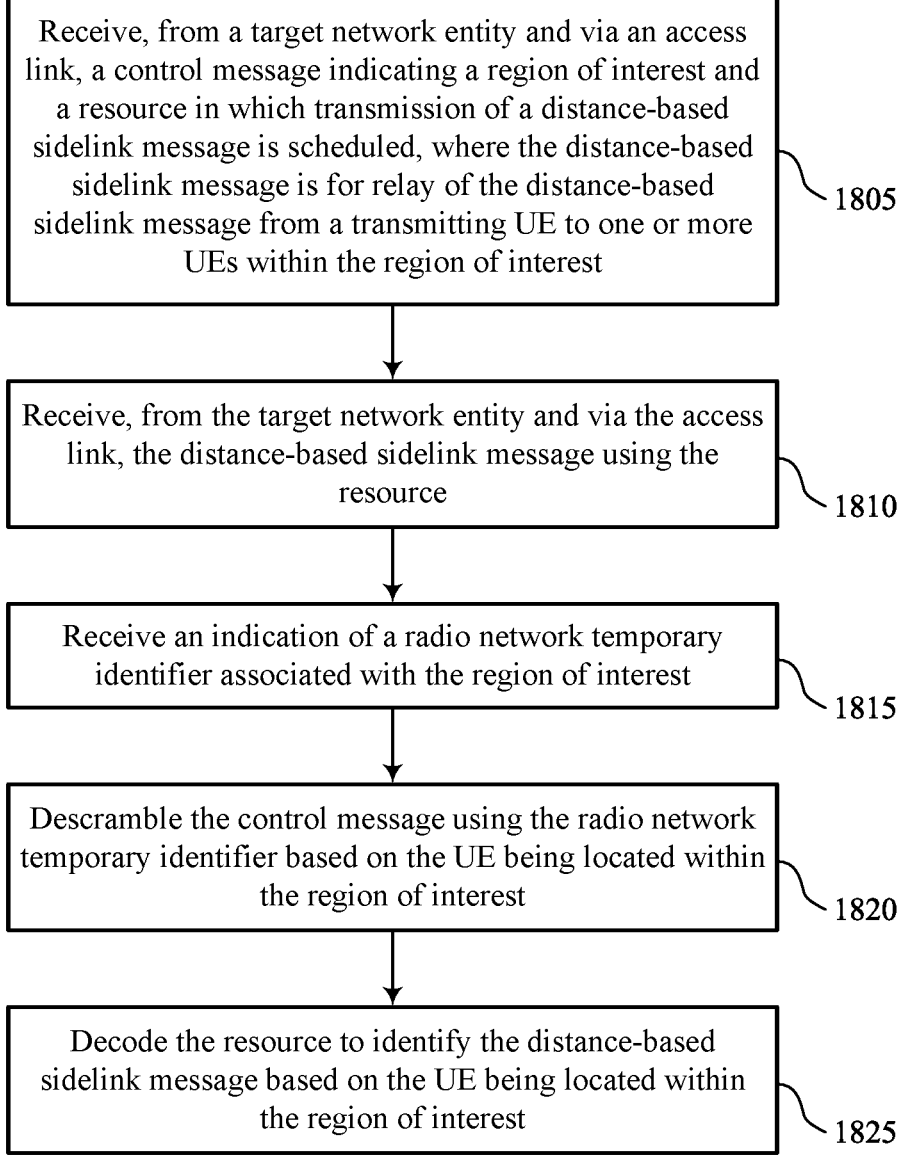

Receive, from a target network entity and via an access link, a control message indicating a region of interest and a resource in which transmission of a distance-based sidelink message is scheduled, where the distance-based sidelink message is for relay of the distance-based sidelink message from a transmitting UE to one or more UEs within the region of interest

1805

Receive, from the target network entity and via the access link, the distance-based sidelink message using the resource

1810

Receive an indication of a radio network temporary identifier associated with the region of interest

1815

Descramble the control message using the radio network temporary identifier based on the UE being located within the region of interest

1820

Decode the resource to identify the distance-based sidelink message based on the UE being located within the region of interest

TECHNIQUES FOR ACCESS LINK BASED RELIABILITY FOR SIDELINK COMMUNICATIONS

FIELD OF TECHNOLOGY

The following relates to method for wireless communication, including techniques for access link based reliability for sidelink communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support techniques for access link based reliability for sidelink communications. For example, the described techniques provide for efficient and reliable communications techniques. The described techniques may enable a communication device, which may be a UE in a wireless communications system (e.g., a vehicle-to-everything (V2X) system, a vehicle-to-vehicle (V2V) network, a cellular V2X (C-V2X) network, a device-to-device (D2D) system, and the like) to leverage backhaul links for inter-UE coordination in sidelink communications. According to one or more aspects, a UE may transmit a sidelink message (e.g., basic safety message) to a serving network entity, where the sidelink message is for relaying to one or more receiver UEs. The serving network entity may identify one or more target network entities serving the one or more recipient UEs. The serving network entity may relay the sidelink message to the selected target network entities. The target network entities may then transmit the sidelink message to the respective recipient UEs.

A method for wireless communications at a serving network entity is described. The method may include receiving, from a user equipment (UE) and via an access link, a distance-based sidelink message including an indication of a region of interest around the UE, where the distance-based sidelink message is for relay of the distance-based sidelink message to one or more UEs within the region of interest, selecting one or more target network entities that provide service to at least a portion of the region of interest around the UE, and transmitting, via a backhaul link, the distance-based sidelink message to the one or more target network entities for relay of the distance-based sidelink message to one or more UEs within the region of interest.

An apparatus for wireless communications at a serving network entity is described. The apparatus may include a memory, and one or more processors coupled to the memory, the one or more processors configured to receive, from a UE and via an access link, a distance-based sidelink message including an indication of a region of interest around the UE, where the distance-based sidelink message is for relay of the distance-based sidelink message to one or more UEs within the region of interest, select one or more target network entities that provide service to at least a portion of the region of interest around the UE, and transmit, via a backhaul link, the distance-based sidelink message to the one or more target network entities for relay of the distance-based sidelink message to one or more UEs within the region of interest.

Another apparatus for wireless communications at a serving network entity is described. The apparatus may include means for receiving, from a UE and via an access link, a distance-based sidelink message including an indication of a region of interest around the UE, where the distance-based sidelink message is for relay of the distance-based sidelink message to one or more UEs within the region of interest, means for selecting one or more target network entities that provide service to at least a portion of the region of interest around the UE, and means for transmitting, via a backhaul link, the distance-based sidelink message to the one or more target network entities for relay of the distance-based sidelink message to one or more UEs within the region of interest.

A non-transitory computer-readable medium storing code for wireless communications at a serving network entity is described. The code may include instructions executable by one or more processors to receive, from a UE and via an access link, a distance-based sidelink message including an indication of a region of interest around the UE, where the distance-based sidelink message is for relay of the distance-based sidelink message to one or more UEs within the region of interest, select one or more target network entities that provide service to at least a portion of the region of interest around the UE, and transmit, via a backhaul link, the distance-based sidelink message to the one or more target network entities for relay of the distance-based sidelink message to one or more UEs within the region of interest.

In some examples of the method, apparatuses, and non-transitory computer-readable medium described herein, receiving the distance-based sidelink message may include operations, features, means, or instructions for receiving the distance-based sidelink message including an indication of a distance relative to a geolocation of the UE, where the distance-based sidelink message may be for relay to one or more UEs within the distance.

In some examples of the method, apparatuses, and non-transitory computer-readable medium described herein, receiving the distance-based sidelink message may include operations, features, means, or instructions for receiving the distance-based sidelink message including an indication of a quantity of one or more zones around the UE, where the distance-based sidelink message may be for relay to one or more UEs within each zone of the quantity of one or more zones.

Some examples of the method, apparatuses, and non-transitory computer-readable medium described herein may further include operations, features, means, or instructions for determining a current geolocation of the UE based on receiving the distance-based sidelink message, where selecting the one or more target network entities may be based on the current geolocation of the UE.

In some examples of the method, apparatuses, and non-transitory computer-readable medium described herein, determining the current geolocation of the UE may include operations, features, means, or instructions for performing a positioning technique to determine the current geolocation of the UE, where the positioning technique includes uplink positioning, downlink positioning, or both.

Some examples of the method, apparatuses, and non-transitory computer-readable medium described herein may further include operations, features, means, or instructions for receiving, from the UE, a control signal indicating a current zone of the UE, a determined geolocation of the UE, or both, where determining the current geolocation of the UE may be based on receiving the control signal.

In some examples of the method, apparatuses, and non-transitory computer-readable medium described herein, selecting the one or more target network entities may include operations, features, means, or instructions for selecting one or more geolocations for relaying the distance-based sidelink message based on a current geolocation of the UE, a distance within which the distance-based sidelink message may be to be relayed, or both.

Some examples of the method, apparatuses, and non-transitory computer-readable medium described herein may further include operations, features, means, or instructions for determining a coverage map including geolocation information related to one or more geographic areas serviced by the serving network entity, the one or more target network entities, or both, where selecting the one or more geolocations may be based on the coverage map.

In some examples of the method, apparatuses, and non-transitory computer-readable medium described herein, selecting the one or more target network entities may include operations, features, means, or instructions for determining one or more zone identifiers for one or more locations for relaying the distance-based sidelink message based on a zone identifier for the UE, where determining the one or more zone identifiers for one or more locations may be based on a coverage map.

In some examples of the method, apparatuses, and non-transitory computer-readable medium described herein, transmitting the distance-based sidelink message may include operations, features, means, or instructions for transmitting the distance-based sidelink message to the one or more target network entities located in one or more locations associated with one or more zone identifiers.

In some examples of the method, apparatuses, and non-transitory computer-readable medium described herein, transmitting the distance-based sidelink message may include operations, features, means, or instructions for transmitting the distance-based sidelink message to the one or more target network entities, the distance-based sidelink message including a quality of service threshold for relay of the distance-based sidelink message to one or more UEs within the region of interest.

A method for wireless communications at a target network entity is described. The method may include receiving, from a serving network entity and via a backhaul link, a distance-based sidelink message relayed from a UE, where the distance-based sidelink message is for relay of the distance-based sidelink message to one or more UEs within a region of interest, transmitting, to the one or more UEs and via an access link, a control message indicating the region of interest and a resource in which transmission of the distance-based sidelink message is scheduled, and transmitting, to the one or more UEs and via the access link, the distance-based sidelink message using the resource.

An apparatus for wireless communications at a target network entity is described. The apparatus may include a memory, and one or more processors coupled to the memory, the one or more processors configured to receive, from a serving network entity and via a backhaul link, a distance-based sidelink message relayed from a UE, where the distance-based sidelink message is for relay of the distance-based sidelink message to one or more UEs within a region of interest, transmit, to the one or more UEs and via an access link, a control message indicating the region of interest and a resource in which transmission of the distance-based sidelink message is scheduled, and transmit, to the one or more UEs and via the access link, the distance-based sidelink message using the resource.

Another apparatus for wireless communications at a target network entity is described. The apparatus may include means for receiving, from a serving network entity and via a backhaul link, a distance-based sidelink message relayed from a UE, where the distance-based sidelink message is for relay of the distance-based sidelink message to one or more UEs within a region of interest, means for transmitting, to the one or more UEs and via an access link, a control message indicating the region of interest and a resource in which transmission of the distance-based sidelink message is scheduled, and means for transmitting, to the one or more UEs and via the access link, the distance-based sidelink message using the resource.

A non-transitory computer-readable medium storing code for wireless communications at a target network entity is described. The code may include instructions executable by one or more processors to receive, from a serving network entity and via a backhaul link, a distance-based sidelink message relayed from a UE, where the distance-based sidelink message is for relay of the distance-based sidelink message to one or more UEs within a region of interest, transmit, to the one or more UEs and via an access link, a control message indicating the region of interest and a resource in which transmission of the distance-based sidelink message is scheduled, and transmit, to the one or more UEs and via the access link, the distance-based sidelink message using the resource.

In some examples of the method, apparatuses, and non-transitory computer-readable medium described herein, transmitting the control message may include operations, features, means, or instructions for transmitting the control message that may be scrambled with a radio network temporary identifier that may be associated with the region of interest.

In some examples of the method, apparatuses, and non-transitory computer-readable medium described herein, transmitting the control message may include operations, features, means, or instructions for transmitting the control message including an indication of a current geolocation of the UE.

In some examples of the method, apparatuses, and non-transitory computer-readable medium described herein, transmitting the control message may include operations, features, means, or instructions for transmitting the control message including an indication of a distance relative to a current geolocation of the UE, where the distance-based sidelink message may be for relay to the one or more UEs within the distance.

In some examples of the method, apparatuses, and non-transitory computer-readable medium described herein, transmitting the distance-based sidelink message may include operations, features, means, or instructions for transmitting a physical downlink shared channel including the distance-based sidelink message using the resource.

A method for wireless communications at a UE is described. The method may include receiving, from a target network entity and via an access link, a control message indicating a region of interest and a resource in which transmission of a distance-based sidelink message is scheduled, where the distance-based sidelink message is for relay of the distance-based sidelink message from a transmitting UE to one or more UEs within the region of interest, receiving, from the target network entity and via the access link, the distance-based sidelink message using the resource, and decoding the resource to identify the distance-based sidelink message based on the UE being located within the region of interest.

An apparatus for wireless communications at a UE is described. The apparatus may include a memory, and one or more processors coupled to the memory, the one or more processors configured to receive, from a target network entity and via an access link, a control message indicating a region of interest and a resource in which transmission of a distance-based sidelink message is scheduled, where the distance-based sidelink message is for relay of the distance-based sidelink message from a transmitting UE to one or more UEs within the region of interest, receive, from the target network entity and via the access link, the distance-based sidelink message using the resource, and decode the resource to identify the distance-based sidelink message based on the UE being located within the region of interest.

Another apparatus for wireless communications at a UE is described. The apparatus may include means for receiving, from a target network entity and via an access link, a control message indicating a region of interest and a resource in which transmission of a distance-based sidelink message is scheduled, where the distance-based sidelink message is for relay of the distance-based sidelink message from a transmitting UE to one or more UEs within the region of interest, means for receiving, from the target network entity and via the access link, the distance-based sidelink message using the resource, and means for decoding the resource to identify the distance-based sidelink message based on the UE being located within the region of interest.

A non-transitory computer-readable medium storing code for wireless communications at a UE is described. The code may include instructions executable by one or more processors to receive, from a target network entity and via an access link, a control message indicating a region of interest and a resource in which transmission of a distance-based sidelink message is scheduled, where the distance-based sidelink message is for relay of the distance-based sidelink message from a transmitting UE to one or more UEs within the region of interest, receive, from the target network entity and via the access link, the distance-based sidelink message using the resource, and decode the resource to identify the distance-based sidelink message based on the UE being located within the region of interest.

Some examples of the method, apparatuses, and non-transitory computer-readable medium described herein may further include operations, features, means, or instructions for receiving an indication of a radio network temporary identifier associated with the region of interest and descrambling the control message using the radio network temporary identifier based on the UE being located within the region of interest.

Some examples of the method, apparatuses, and non-transitory computer-readable medium described herein may further include operations, features, means, or instructions for determining whether the UE may be located within a distance relative to a current geolocation of the transmitting UE, where decoding the resource may be based on the UE being located within the distance relative to the current geolocation of the transmitting UE.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

FIGS. 13 through 18 show flowcharts illustrating methods that support techniques for access link based reliability for sidelink communications in accordance with one or more aspects of the present disclosure.

DETAILED DESCRIPTION

Figure 1:
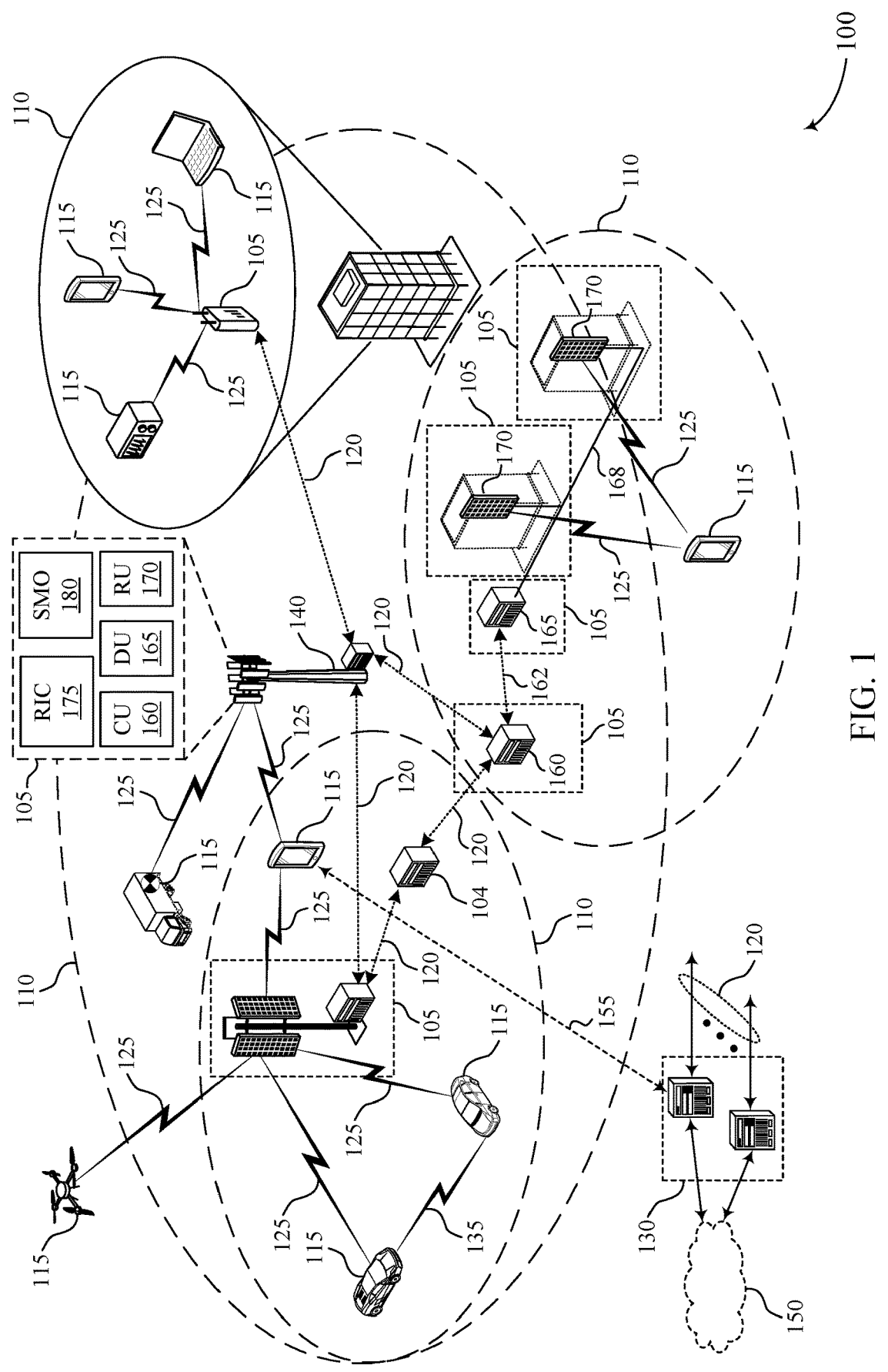
FIG. 1 shows an example of a wireless communications system that supports techniques for access link based reliability for sidelink communications in accordance with one or more aspects of the present disclosure.

A wireless communications system may support both access links and sidelinks for communications between one or more communication devices. An access link may refer to a communication link between a user equipment (UE) and a network entity. For example, an access link may support uplink signaling, downlink signaling, connection procedures, etc. A sidelink may refer to any communication link between similar wireless devices (e.g., a communication link between UEs, or a backhaul communication link between base stations). It is noted that while various examples provided herein are discussed for UE sidelink devices, such sidelink techniques may be used for any type of wireless devices that use sidelink communications. For example, a sidelink may support one or more of device-to-device (D2D) communications, vehicle-to-everything (V2X) or vehicle-to-vehicle (V2V) communications, message relaying, discovery signaling, beacon signaling, or other signals transmitted over-the-air from one UE to one or more other UEs. Sidelink communications may support communications within a group of UEs. For example, sidelink communications may include communications between a UE and other UEs within a coverage area including the group of UEs (e.g., a coverage area provided by a network entity, a coverage area outside of the coverage area provided by the network entity, or a combination thereof).

In sidelink communications, a transmitting UE and a receiving UE may support a distance-based feedback. A receiver UE may receive a message from a transmitter UE using a sidelink channel and the receiver UE may send a negative acknowledgement message if it is unable to decode the sidelink channel. In some cases, the transmitter UE and the receiver UE may support such message exchange within a minimum communication range. In some examples, the transmitter UE may calculate the minimum communication range based on a current location of the transmitter UE or on a zone-based location of the transmitter UE. Instead of using direct V2X communications, the transmitter UE and the receiver UE may leverage existing backhaul links to provide V2X services.

One or more aspects of the present disclosure provide for wireless communications systems supporting V2X transmission. The techniques depicted herein leverage access link connections (e.g., Uu links) to communicate (e.g., relay) distance-based messages from a transmitter UE to one or more receiver UEs. In some examples, a transmitter UE (UE1) may be under the coverage of a serving network entity (network entity 1), and a receiver UE (UE2) may be under the coverage of a target network entity (network entity 2). The UE1 may intend to perform distance-based transmission with UE2. That is, UE1 may intend to transmit a V2X message (e.g., basic safety message) communication within a distance d from its current location. In such cases, the serving network entity (network entity 1) of the UE1 may obtain one or more equivalent Uu parameters of the V2X message generated by UE1. For example, the network entity 1 may identify a current location of UE1 and may identify a region of interest around UE1 where the V2X message would be valid. The network entity 1 may then select a target network entity (network entity 2) within the region of interest and may request the network entity 2 to transmit the V2X message to relevant UEs (e.g., UE2) in its coverage area that also occur within the region of interest.

UEs capable of sidelink communications may utilize the techniques described herein to experience power saving, such as reduced power consumption and extended battery life while ensuring reliable and efficient communications in the group of UEs. Particular aspects of the subject matter described in this disclosure may be implemented to realize one or more of the following potential advantages. The techniques employed by the described UEs may provide benefits and enhancements to the operation of the UEs. For example, operations performed by the UEs may provide improvements to wireless operations. In some examples, the UEs may support high reliability and low latency communications, among other examples, in accordance with aspects of the present disclosure. The described techniques may thus include features for improvements to power consumption, spectral efficiency, higher data rates and, in some examples, may promote enhanced efficiency for high reliability and low latency operations, among other benefits.

Aspects of the disclosure are initially described in the context of wireless communications systems. Aspects of the disclosure are further illustrated by and described with reference to a process flow. Aspects of the disclosure are further illustrated by and described with reference to apparatus diagrams, system diagrams, and flowcharts that relate to techniques for access link based reliability for sidelink communications.

FIG. 1 shows an example of a wireless communications system 100 that supports techniques for access link based reliability for sidelink communications in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support techniques for access link based reliability for sidelink communications as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $TS=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

Some wireless communications system may support both access links and sidelinks for communications between one or more communication devices. An access link may refer to a communication link between a UE 115 (e.g., vehicular UEs) and a network entity 105. A sidelink may refer to any communication link between similar wireless devices (e.g., a communication link between UEs, or a backhaul communication link between network entities). In wireless communications systems supporting V2X transmission, UEs 115 may support distance based feedback. In some examples, distance-based feedback may be enabled for groupcast feedback. A UE 115 may receive sidelink communication via a physical sidelink shared channel. In such cases, the receiver UE 115 within a communication range may send a negative acknowledgement if physical sidelink shared channel decoding fails. Additionally, or alternatively, the UE 115 or the network entity 105 or both may support a minimum communication range. The minimum communication range values may include {20, 50, 80, 100, 120, 150, 180, 200, 220, 250, 270, 300, 350, 370, 400, 420, 450, 480, 500, 550, 600, 700, 1000} meters with 8 spare values. In some examples, application-dependent minimum communication range may be indicated in a sidelink control information (e.g., SCI-2) as an index into a 16-value subset of the set of minimum communication range values.

A communication device may compute a distance between transmitter and receiver using UE locations. For example, such distance computation may be based on zone-based location indication by a transmitting UE using a control signal (e.g., SCI-2). In some cases, zones may be square in shape with dimensions (pre)configured from {5, 10, 20, 30, 40, 50} meters. Additionally, or alternatively, the zones may be in any shapes or dimensions. In some examples, a communication device may determine a zone identifier from UE geographical longitude/latitude. The zone identifier may be a 12-bit zone identifier indication including least significant bit of sampled UE location or geographical longitude/latitude. As such, the distance between a transmitter and receiver may be computed from a transmitted zone identifier and a receiver UE location.

Some wireless communications systems supporting sidelink communications may further support vehicle to network to everything communication. For instance, UEs and network entities may leverage access communication links (e.g., Uu networks) to provide V2X services. One or more aspects of the present disclosure provide for adopting the basic safety message transmission or cooperative awareness message transmission from sidelink to Uu. In some examples, the aspects depicted herein provide for defining the profile usage when using the network and defining the additional load on the network. In some examples, a first UE (UE1) may be under the coverage of a first network entity (NE1); a second UE (UE2) may be under coverage of a second network entity (NE2); a third UE (UE3) and a fourth UE (UE4) may be under the coverage of a third network entity (NE3). In such an example, UE1 (the transmitting UE) may intend to perform distance-based transmission by way of performing connectionless groupcast via Uu (network) with UE2, UE3. For instance, the UE1 may intend that its basic safety message communication is to reach a distance d from its current location. In this example, UE2 and UE3 may be located within that distance. However, UE4 may not be within distance d from UE1. In such cases, using the techniques depicted herein, NE1 may determine the appropriate network entities (in this case NE2 and NE3) for delivering the message to the UEs they are serving.

According to one or more aspects, a serving network entity 105 may receive, from a UE 115 and via an access link, a distance-based vehicular sidelink message including an indication of a region of interest around the UE 115. In some examples, the distance-based vehicular sidelink message may be for relay of the distance-based vehicular sidelink message to one or more UEs within the region of interest. The serving network entity 105 may select one or more target network entities that provide service to at least a portion of the region of interest around the UE 115. The serving network entity 105 may then transmit, via a backhaul link, the distance-based vehicular sidelink message to the one or more target network entities 105 for relay of the distance-based vehicular sidelink message to one or more UEs within the region of interest.

In some examples, a target network entity 105 may receive, from a serving network entity 105 and via a backhaul link, a distance-based vehicular sidelink message relayed from a TE 115. In some cases, the distance-based vehicular sidelink message may be for relay of the distance-based vehicular sidelink message to one or more UEs within a region of interest. The target network entity 105 may transmit, to the one or more UEs 115 and via an access link, a control message indicating the region of interest and a resource in which transmission of the distance-based vehicular sidelink message is scheduled. The target network entity 105 may then transmit, to the one or more UEs and via the access link, the distance-based vehicular sidelink message using the resource.

In some aspects, a TE 115 may receive, from a target network entity 105 and via an access link, a control message indicating a region of interest and a resource in which transmission of a distance-based vehicular sidelink message is scheduled. In some examples, the distance-based vehicular sidelink message may be for relay of the distance-based vehicular sidelink message from a transmitting TE 115 to one or more UEs within the region of interest. The TE 115 may receive, from the target network entity 105 and via the access link, the distance-based vehicular sidelink message using the resource. The UE 115 may then decode the resource to identify the distance-based vehicular sidelink message based on the TE 115 being located within the region of interest.

Figure 2:
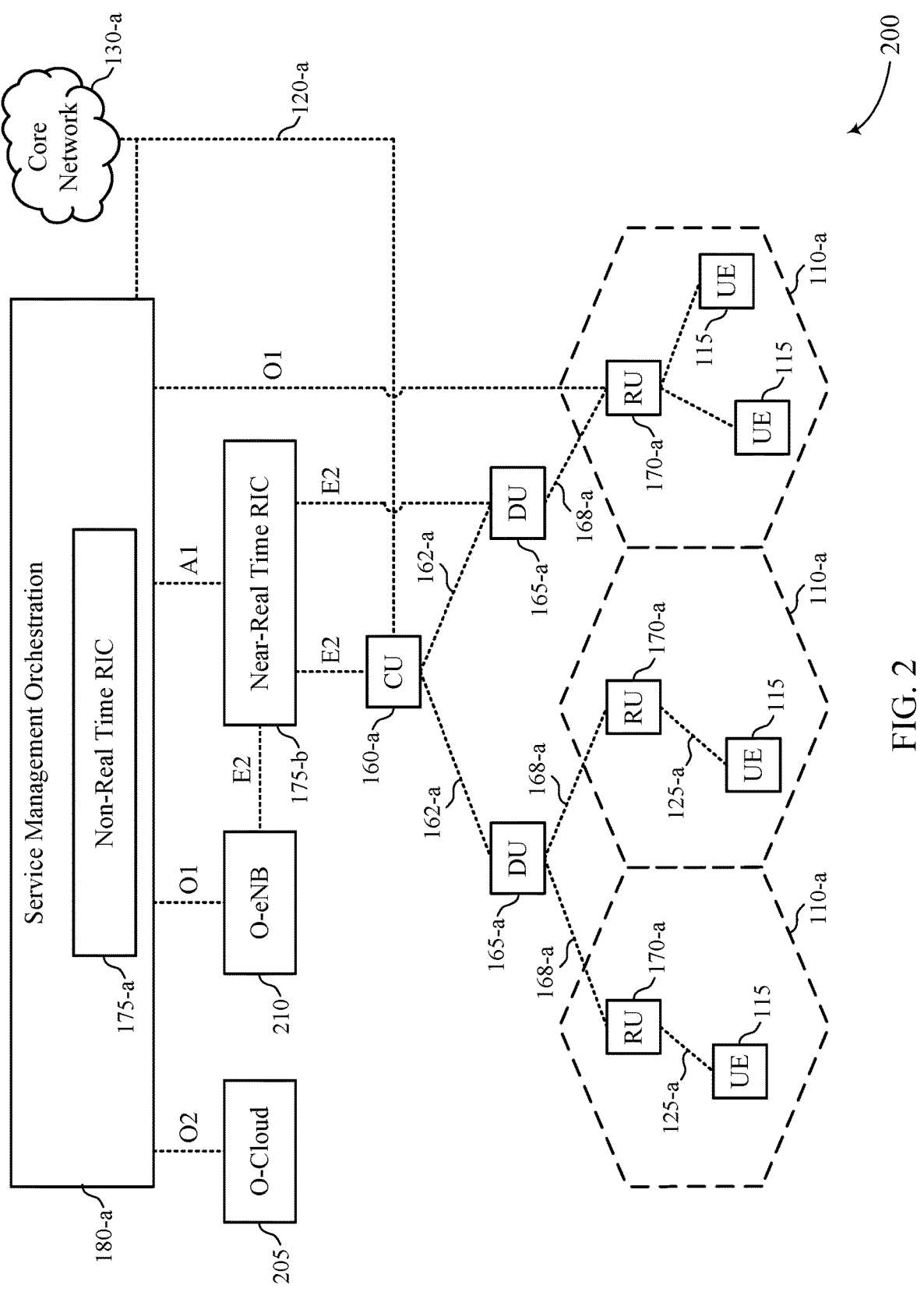
FIG. 2 shows an example of a network architecture that supports techniques for access link based reliability for sidelink communications in accordance with one or more aspects of the present disclosure.

FIG. 2 shows an example of a network architecture 200 (e.g., a disaggregated base station architecture, a disaggregated RAN architecture) that supports techniques for access link based reliability for sidelink communications in accordance with one or more aspects of the present disclosure. The network architecture 200 may illustrate an example for implementing one or more aspects of the wireless communications system 100. The network architecture 200 may include one or more CUs 160-a that may communicate directly with a core network 130-a via a backhaul communication link 120-a, or indirectly with the core network 130-a through one or more disaggregated network entities 105 (e.g., a Near-RT RIC 175-b via an E2 link, or a Non-RT RIC 175-a associated with an SMO 180-a (e.g., an SMO Framework), or both). A CU 160-a may communicate with one or more DUs 165-a via respective midhaul communication links 162-a (e.g., an F1 interface). The DUs 165-a may communicate with one or more RUs 170-a via respective fronthaul communication links 168-a. The RUs 170-a may be associated with respective coverage areas 110-a and may communicate with UEs 115 via one or more communication links 125-a. In some implementations, a UE 115 may be simultaneously served by multiple RUs 170-a.

Each of the network entities 105 of the network architecture 200 (e.g., CUs 160-a, DUs 165-a, RUs 170-a, Non-RT RICs 175-a, Near-RT RICs 175-b, SMOs 180-a, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-*a* may host one or more higher layer control functions. Such control functions may include RRC, PDCP, SDAP, or the like. Each control function may be implemented with an interface configured to communicate signals with other control functions hosted by the CU 160-*a*. A CU 160-*a* may be configured to handle user plane functionality (e.g., CU-UP), control plane functionality (e.g., CU-CP), or a combination thereof. In some examples, a CU 160-*a* may be logically split into one or more CU-UP units and one or more CU-CP units. A CU-UP unit may communicate bidirectionally with the CU-CP unit via an interface, such as an E1 interface when implemented in an O-RAN configuration. A CU 160-*a* may be implemented to communicate with a DU 165-*a*, as necessary, for network control and signaling.

A DU 165-*a* may correspond to a logical unit that includes one or more functions (e.g., base station functions, RAN functions) to control the operation of one or more RUs 170-*a*. In some examples, a DU 165-*a* may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-*a* may further host one or more low PHY layers. Each layer may be implemented with an interface configured to communicate signals with other layers hosted by the DU 165-*a*, or with control functions hosted by a CU 160-*a*.

In some examples, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-*a* may be implemented to handle over the air (OTA) communication with one or more UEs 115-*a*. In some implementations, real-time and non-real-time aspects of control and user plane communication with the RU(s) 170-*a* may be controlled by the corresponding DU 165-*a*. In some examples, such a configuration may enable a DU 165-*a* and a CU 160-*a* to be implemented in a cloud-based RAN architecture, such as a vRAN architecture.

The SMO 180-*a* may be configured to support RAN deployment and provisioning of non-virtualized and virtualized network entities 105. For non-virtualized network entities 105, the SMO 180-*a* may be configured to support the deployment of dedicated physical resources for RAN coverage requirements which may be managed via an operations and maintenance interface (e.g., an O1 interface). For virtualized network entities 105, the SMO 180-*a* may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-*a*, DUs 165-*a*, RUs 170-*a*, and Near-RT RICs 175-*b*. In some implementations, the SMO 180-*a* may communicate with components configured in accordance with a 4G RAN (e.g., via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-*b*. The Non-RT RIC 175-*a* may be coupled to or communicate with (e.g., via an A1 interface) the Near-RT RIC 175-*b*. The Near-RT RIC 175-*b* may be configured to include a logical function that enables near-real-time control and optimization of RAN elements and resources via data collection and actions over an interface (e.g., via an E2 interface) connecting one or more CUs 160-*a*, one or more DUs 165-*a*, or both, as well as an O-eNB 210, with the Near-RT RIC 175-*b*.

In some examples, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some examples, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (e.g., reconfiguration via O1) or via generation of RAN management policies (e.g., A1 policies).

Figure 3:
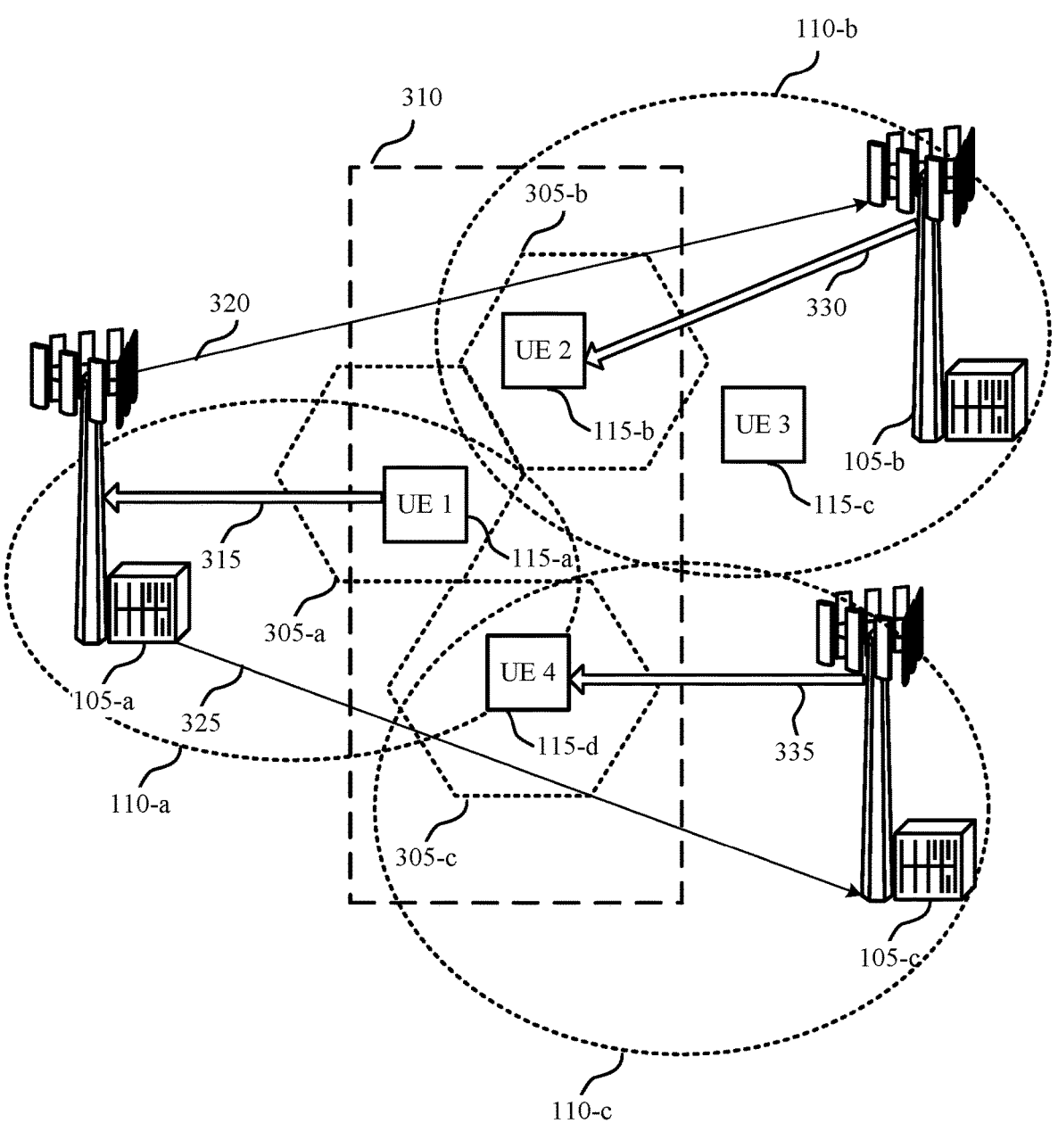
FIG. 3 shows an example of a wireless communications system that supports techniques for access link based reliability for sidelink communications in accordance with one or more aspects of the present disclosure.

FIG. 3 shows an example of a wireless communications system 300 that supports techniques for access link based reliability for sidelink communications in accordance with one or more aspects of the present disclosure. In some examples, the wireless communications system 300 may implement aspects of wireless communications system 100. The wireless communications system 300 includes a first network entity 105-*a* serving a first UE 115-*a* (UE 1) in a first geographic coverage area 110-*a*, a second network entity 105-*a* serving a second UE 115-*b* (UE 2) and a third UE 115-*c* (UE 3) in a second geographic coverage area 110-*b*, and a third network entity 105-*c* serving a fourth UE 115-*d* (UE 4) in a third geographic coverage area 110-*c*.

In some cases, the wireless communications system 300 may utilize control signaling to schedule resources for UEs 115 to perform sidelink communications. Additionally or alternatively, the UEs 115 in the wireless communications system 300 may utilize shared information to enhance scheduling, inter-UE coordination, and communications flexibility. In some examples, the UEs 115 (e.g., UE 115-*a*, UE 115-*b*, UE 115-*c*, and UE 115-*d*) may communicate with each other (e.g., within a V2X system, a D2D system, and the like) and may employ sidelink transmissions to save power, reduce latency, and ensure reliable communications. In some examples, vehicles may communicate using V2X communications.

The wireless communications system 300 may support both access links and sidelinks for communications between one or more communication devices. An access link may refer to a communication link between a UE 115 (such as, UE 115-*a*) and a network entity 105-*a*. A sidelink may refer to any communication link between similar wireless devices (e.g., a communication link between UEs, or a backhaul communication link between base stations). It is noted that while various examples provided herein are discussed for UE sidelink devices, such sidelink techniques may be used for any type of wireless devices that use sidelink communications. For example, a sidelink may support one or more of D2D communications, V2X or V2V communications, message relaying, discovery signaling, beacon signaling, or other signals transmitted over-the-air from one UE to one or more other UEs.

Network entity 105-a may communicate with UE 115-a (UE 1), network entity 105-b may communicate with UE 115-b (UE 2) and UE 115-c (UE 3), and network entity 105-c may communicate with UE 115-d (UE 4). In some examples, UE 115-a (UE 1) may determine that it has data to transmit to a group of UEs which may be included within a UE group 310 (including UE 1, UE 2 and UE 4). However, the UEs 115 in the UE group 310 may not have an active communication link. In such cases, the UE 115-a may use the corresponding network entity 105-a to transmit the data transmission. In some examples, the group of UEs 115 may utilize sidelinks communications in addition to access links with the network entities 105.

In some examples, sidelink communications may support communications within a group of UEs 115 (e.g., group 310). For instance, sidelink communications may include communications between a UE (such as, UE 115-a, UE 115-b, and UE 115-c) and other UEs 115 within a coverage area including the group of UEs (e.g., a coverage area provided by a network entity, a coverage area outside of the coverage area provided by the network entity, or a combination thereof). One or more of the UEs 115 in the group of UEs 115 may be in a coverage area 110-a of the network entity 105-a, coverage area 110-b of the network entity 105-b, and coverage area 110-c of the network entity 105-c (e.g., a coverage area 110 with reference to FIG. 1). In such examples, a UE 115-a may communicate with the network entity 105-a via a Uu interface (e.g., the network entity 105-a may transmit downlink communications to the UE 115-a and receive uplink communications from the UE 115-a via an access link).

In some cases, a UE 115 (such as, UE 115-a, UE 115-b, and UE 115-c) may have information (e.g., a detection of an object or obstacle on a road in a V2X system, scheduling information, V2X service information, basic safety messages, among other examples) to transmit to the group 310 of UEs 115, and the UE 115 may initiate communications to transmit the information to the other UEs 115 in the group 310. In such cases, the UE 115-a initiating the communications may be referred to as a transmitting UE and the UEs 115 receiving the communications may be referred to as receiving UEs.

According to one or more aspects depicted herein, a transmitting UE may determine to transmit a sidelink message (e.g., V2X message) to one or more UEs 115 (e.g., UEs 115 in the group 310). In such cases, a serving network entity of the transmitting UE (UE 1, in this example) may obtain one or more equivalent access link parameters (e.g., Uu parameters) of the sidelink message generated by UE 1. This enables the serving network entity 105-a to in turn request one or more relevant network entities (or target network entities) to transmit the sidelink message to relevant UEs in its coverage area.

In some examples, the UE 1 may transmit, via an access link 315, a distance-based sidelink message including an indication of a region of interest (e.g., region corresponding to the group 310) around the UE 1. The distance-based sidelink message may be for relay of the distance-based sidelink message to one or more UEs (UE 2 and UE 4) within the region of interest. For example, the UE 1 may transmit a distance based V2X message to its serving network entity 105-a indicating one or more of a distance d for which the V2X message is valid, or a number of zones around UE 1 for which the V2X message is valid. As depicted in the example of FIG. 3, the UE 1 may be included in zone 305-a, the UE 2 may be included in zone 305-b, and the UE 4 may be included in zone 305-c.

The serving network entity 105-a may receive an indication of a distance relative to a geolocation of the UE 1, where the distance-based sidelink message is for relay to one or more UEs within the distance. That is, the UE 1 may indicate a distance d for transmission of the sidelink message. Additionally, or alternatively, the serving network entity 105-a may receive the distance-based sidelink message including an indication of a quantity of one or more zones around the UE 115-a. The distance-based sidelink message may be for relay to one or more UEs within each zone of the quantity of one or more zones. As depicted in the example of FIG. 3, the UE 1 may indicate zone 305-b and zone 305-c in the message to the serving network entity 105-a via the access link 315. The serving network entity 105-a may determine that UE 2 is included in zone 305-b and UE 4 is included in zone 305-c.

In some examples, the serving network entity 105-a may obtain the current location of UE 1. For instance, the serving network entity 105-a may obtain the current location of UE 1 based on initiating a uplink/downlink positioning to determine the location of UE 1. The serving network entity 105-a may perform a positioning technique to determine the current geolocation of the UE 115-a, where the positioning technique may include uplink positioning, downlink positioning, or both. Additionally, or alternatively, the UE 1 may indicate its current zone 305-a or absolute location to the serving network entity 105-a in uplink (e.g., access link 315 via RRC) when the request to transmit the V2X message via an access link (e.g., Uu link) is made by the UE 1. For example, the serving network entity 105-a may receive, from the UE 115-a, a control signal indicating a current zone of the UE 115-a, a determined geolocation of the UE 115-a, or both. In such cases, the serving network entity 105-a may determine the current geolocation of the UE 115-a based on receiving the control signal.

The serving network entity 105-a may then select one or more target network entities (target network entity 105-b and target network entity 105-c) that provide service to at least a portion of the region of interest around the UE 115-a. In some examples, the serving network entity 105-a may infer which other network entities 105 it needs to request for relaying the sidelink message transmission. The serving network entity 105-a may select one or more geolocations for relaying the distance-based sidelink message based on a current geolocation of the UE 115-a, a distance within which the distance-based sidelink message is to be relayed, or both.

From the current location of UE 1, and the distance for which the sidelink message (e.g., V2X message) is valid, the serving network entity 105-a may calculate the locations where the current sidelink transmission needs to be relayed. Based on the coverage map including network entity identifiers describing network entities servicing a particular location, the serving network entity 105-a may determine the target network entities to which second transmission from UE 1 needs to be relayed. In some examples, the serving network entity 105-a may determine a coverage map including geolocation information related to one or more geographic areas serviced by the serving network entity 105-a, the one or more target network entities, 105-b and 105-c or both. In such cases, the serving network entity 105-*a* may select one or more geolocations for relaying the distance-based sidelink message based on the coverage map. For example, based on receiving the message from UE 1, the serving network entity 105-*a* may determine that the UE 1 is looking to relay the messages to UE 2 and UE 4. The serving network entity 105-*a* may then select the target network entities (target network entity 105-*b* and target network entity 105-*c*) serving the target UEs. In some examples, from the zone that UE 1 is in currently, and the number of zones for which the sidelink message (e.g., V2X message) is valid, the serving network entity 105-*a* may calculate the zone identifiers (e.g., for zone 305-*b* and zone 305-*c*) where the sidelink message needs to be relayed. Based on the coverage map that includes the network entity identifiers servicing a particular zone (zone identifiers), the serving network entity 105-*a* may determine the target network entities to which the sidelink transmission from UE 1 needs to be relayed. For example, the serving network entity 105-*a* may determine one or more zone identifiers for one or more locations for relaying the distance-based sidelink message based on a zone identifier for the UE 115-*a*. In some cases, the serving network entity 105-*a* may determine the one or more zone identifiers for one or more locations is based on a coverage map.

Upon selecting the target network entities, the serving network entity 105-*a* may transmit, via a backhaul link, the distance-based sidelink message to the one or more target network entities 105 for relay of the distance-based sidelink message to one or more UEs 115 within the region of interest. As depicted in the example of FIG. 3, the serving network entity 105-*a* selects target network entity 105-*b* and target network entity 105-*c* for relaying the sidelink message. The serving network entity 105-*a* then transmits the distance-based sidelink message to the target network entity 105-*b* via backhaul link 320. Additionally, the serving network entity 105-*a* transmits the distance-based sidelink message to the target network entity 105-*c* via backhaul link 325. For example, the serving network entity 105-*a* may relay the sidelink message (e.g., V2X message) transmitted by UE 1 to other target network entities using a backhaul link, such as an X2 interface. In some examples, the serving network entity 105-*a* may also provide one or more messages to at least one or every target network entity that it relays the sidelink message (e.g., V2X message). For instance, the serving network entity 105-*a* may transmit the distance-based sidelink message (e.g., V2X message) to the one or more target network entities (target network entity 105-*b* and target network entity 105-*c*) located in one or more locations (zone 305-*b* and zone 305-*c*) associated with one or more zone identifiers.

In some examples, the serving network entity 105-*a* may indicate a quality of service requirement for the distance-based sidelink message (e.g., V2X message), such that the one or more target network entities uses an appropriate modulate and coding scheme, or coding rate, or both, when communicating with receiver UEs (e.g., UE 115-*b* and UE 115-*c*). For instance, the serving network entity 105-*a* may transmit the distance-based sidelink message to the one or more target network entities, the distance-based sidelink message including a quality of service threshold for relay of the distance-based sidelink message to one or more UEs within the region of interest. Upon receiving the message from the serving network entity 105-*a*, each target network entity may relay the V2X message in its coverage area. The serving network entity 105-*a* may deliver the V2X message to those regions which is at most at a distance d from UE 1's location, or at a preconfigured number of zones away from the zone at which UE 1 is located.

In some examples, the target network entity 105-*b* may receive, from the serving network entity 105-*a* and via a backhaul link 320, a distance-based sidelink message relayed from the UE 115-*a*. Similarly, the target network entity 105-*c* may receive, from the serving network entity 105-*a* and via a backhaul link 325, a distance-based sidelink message relayed from the UE 115-*a*. The distance-based sidelink message may be for relay of the distance-based sidelink message to one or more UEs (e.g., UE 2 and UE 4) within a region of interest (e.g., group 310). Each target network entity 105 may transmit, to the one or more UEs and via an access link, a control message indicating the region of interest and a resource in which transmission of the distance-based sidelink message is scheduled. For example, the target network entity 105-*b* transmits the control message to UE 2 via access link 330 and the target network entity 105-*c* transmits the control message to UE 4 via access link 335. In some examples, the target network entity 105-*b* and the target network entity 105-*c* may transmit zone information to one or more receiver UEs in a downlink control information message. In some examples, the target network entity may assign a zone-specific V2X radio network temporary identifier applicable to UEs in a zone. When a target network entity 105 wants to relay a distance-based sidelink message, the target network entity 105 may scrambles its downlink control information message with the corresponding zone-specific V2X radio network temporary identifier.

If the target network entity 105 intends to relay the sidelink message (e.g., V2X message) to multiple zones in a cell, then the target network entity 105 may scramble the downlink control information message of the sidelink message for every zone with the corresponding zone-specific V2X radio network temporary identifier before it transmits in its coverage area. In some examples, the target network entity 105 may transmit a physical downlink shared channel including the distance-based sidelink message using the resource indicated in the control message. In some examples, the target network entity 105 may indicate the location of UE 1 and the communication distance d information in the downlink control information message.

The target network entity 105-*b* transmits the distance-based sidelink message to the receiver UE 2 via access link 330 and the target network entity 105-*c* transmits the distance-based sidelink message to the receiver UE 4 via access link 335. Each receiver UE 115 may receive a control message (e.g., DCI) indicating a region of interest and a resource in which transmission of a distance-based sidelink message is scheduled (PDSCH resource that includes the distance-based sidelink message). In some examples, the distance-based sidelink message may be for relay of the distance-based sidelink message from a transmitting UE to one or more UEs within the region of interest. A receiver UE (e.g., UE 2 and UE 4) may decode a physical downlink shared channel, to obtain the distance-based sidelink message, if the zone information transmitted in the downlink control information message matches with the zone where the receiver UE is located. If the receiver UE zone is different from the one indicated in the downlink control information message, then the receiver UE discards the message. For example, the receiver UE may receive, from the target network entity and via the access link, the distance-based sidelink message using the resource and may decode the resource to identify the distance-based sidelink message based on the receiver UE being located within the region of interest. For instance, both UE 2 and UE 4 may receive the distance-based sidelink message from the network entity 105-*b*. UE 4 may determine that it is not located within the region of interest and may not decode the message.

According to one or more aspects depicted herein, the target network entity 105 may configure UEs 115 in one or more zones, or up to every zone, with their zone specific V2X radio network temporary identifier. The receiver UE may use the zone specific V2X radio network temporary identifier to decode the physical downlink control channel (PDCCH). For example, a receiver UE (UE 2 or UE 4 or both) may receive an indication of a radio network temporary identifier associated with the region of interest. The receiver UE 115 may then descramble the control message using the radio network temporary identifier based on the receiver UE being located within the region of interest. The descrambling process may be part of a deciding procedure at the receiver UE 115. If the decode is successful, the receiver UE 115 may determine that the distance-based sidelink message (e.g., V2X message) is applicable for it and may proceed to decode the corresponding physical downlink shared channel that includes the actual sidelink message (e.g., the distance-based sidelink message). In some examples, the receiver UE 115 may calculate whether its location is within an indicated communication distance d from the transmitter UE's (UE 1) location. If its location is within an indicated communication distance d, then the receiver UE may proceed to decode the physical downlink shared channel including the V2X message (e.g., the distance-based sidelink message). For example, the receiver UE 115 may determine whether the receiver UE 115 is located within a distance relative to a current geolocation of the transmitting UE 115-*a*. In some examples, the receiver UE 115 (UE 2 or UE 4 or both) may decode the resource may be based on the receiver UE being located within the distance relative to the current geolocation of the transmitting UE 115-*a*.

Figure 4:
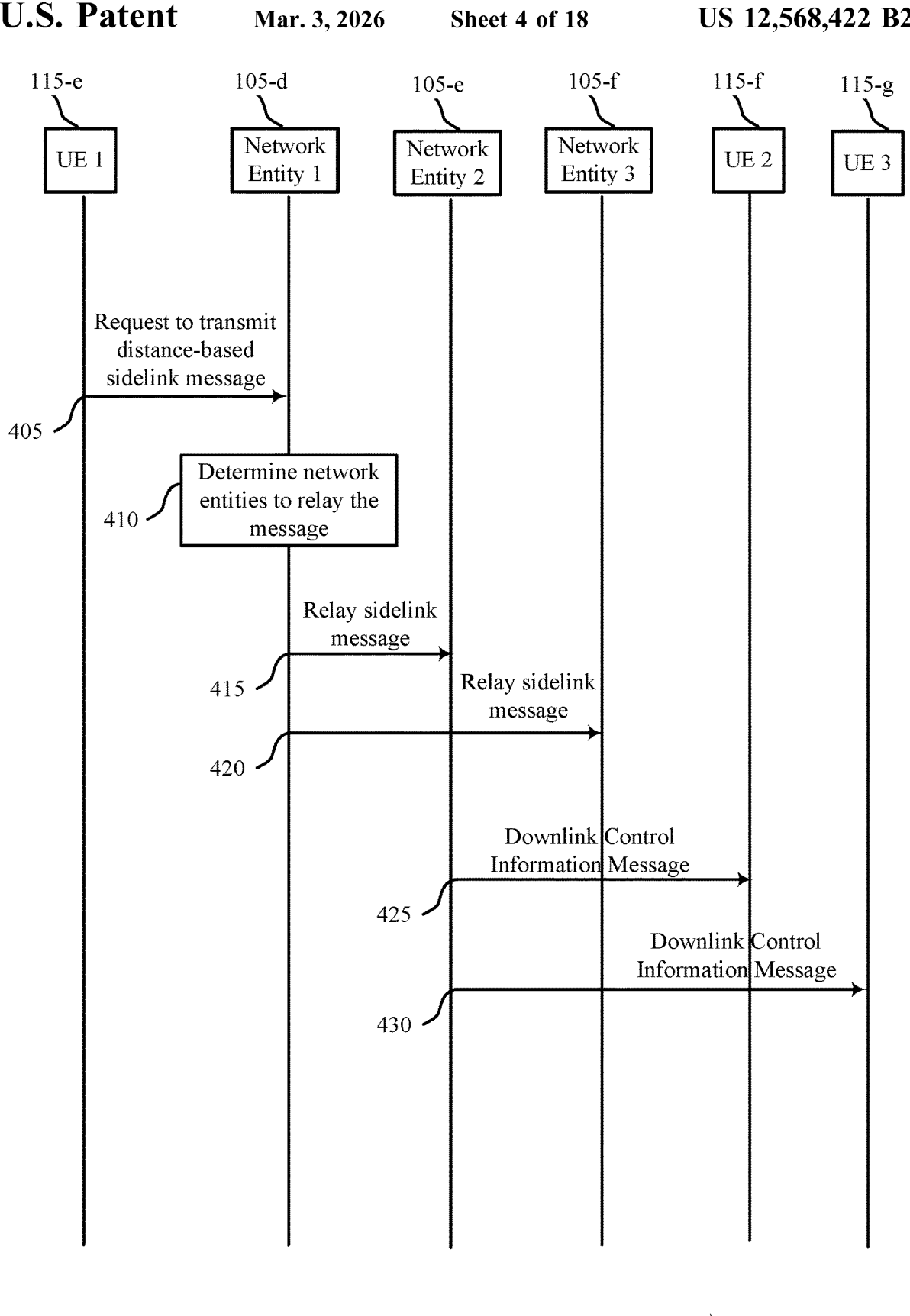
FIG. 4 shows an example of a process flow that supports techniques for access link based reliability for sidelink communications in accordance with one or more aspects of the present disclosure.

FIG. 4 shows an example of a process flow 400 that supports techniques for access link based reliability for sidelink communications in accordance with one or more aspects of the present disclosure. In some examples, the process flow 400 may implement aspects of the wireless communications system 100 and 300 described with reference to FIGS. 1 and 3, respectively. For example, the process flow 400 may be based on one or more rules for inter-UE and inter-network entity coordination in sidelink communication. The process flow 400 may be implemented by the UE 115-*e* (UE 1), the UE 115-*f* (UE 2), the UE 115-*g* (UE 3), the network entity 105-*d* (network entity 1), the network entity 105-*e* (network entity 2), and the network entity 105-*f* (network entity 3) for reduced power consumption, and may promote low latency and low interference for wireless communications supporting high priority channels, among other benefits. The UE 115-*e*, the UE 115-*f*, and the UE 115-*g* may be examples of a UE 115, as described with reference to FIGS. 1, 2 and 3. The network entity 105-*d*, the network entity 105-*e*, and the network entity 105-*f* may be examples of a network entity 105, as described with reference to FIGS. 1, 2 and 3.

In the following description of the process flow 400, the operations between the UE 115-*e* (UE 1), the UE 115-*f* (UE 2), the UE 115-*g* (UE 3), the network entity 105-*d* (network entity 1), the network entity 105-*e* (network entity 2), and the network entity 105-*f* (network entity 3) may be transmitted in a different order than the example order shown, or the operations performed by the UE 115-*e* (UE 1), the UE 115-*f* (UE 2), the UE 115-*g* (UE 3), the network entity 105-*d*

(network entity 1), the network entity 105-*e* (network entity 2), and the network entity 105-*f* (network entity 3) may be performed in different orders or at different times. Some operations may also be omitted from the process flow 400, and other operations may be added to the process flow 400.

At 405, the UE 115-*e* (UE 1) may transmit a request to transmit a distance-based sidelink message to the network entity 105-*d* (network entity 1). The network entity 1 may receive, from UE 1 and via an access link, a distance-based sidelink message including an indication of a region of interest around the UE 1. In some cases, the distance-based sidelink message may be for relay of the distance-based sidelink message to one or more UEs within the region of interest. For example, the message may include one or more of a location, a zone, a communication distance, or a combination thereof.

At 410, the network entity 1 may receive the distance-based message and may one or more network entities to relay the message. The network entity 1 may select one or more target network entities that provide service to at least a portion of the region of interest around the UE 1. In the example of FIG. 4, the network entity 1 may select network entity 2 and network entity 3 as target network entities for relaying the distance-based sidelink message.

At 415, the network entity 1 may transmit, via a backhaul link, the distance-based sidelink message to the network entity 2 for relay of the distance-based sidelink message to one or more UEs within the region of interest. At 420, the network entity 1 may transmit, via a backhaul link, the distance-based sidelink message to the network entity 3 for relay of the distance-based sidelink message to one or more UEs within the region of interest. The network entity 1 may relay the distance-based sidelink message including one or more of a zone identifier, a location of UE 1, a communication range, or a combination thereof.

At 425, the network entity 2 may transmit, to UE 2 and via an access link, a control message (e.g., DCI message) indicating the region of interest and a resource in which transmission of the distance-based sidelink message is scheduled. At 430, the network entity 3 may transmit, to UE 3 and via an access link, a control message indicating the region of interest and a resource in which transmission of the distance-based sidelink message is scheduled. The control message may be or include a downlink control information message. In some examples, the control message may include an indication of a current geolocation of the UE 1. Additionally, or alternatively, the control message may include an indication of a zone identifier or a communication range or both.

Upon receiving the control message, each recipient UE (UE 2 and UE 3) may decode a resource indicated in the control message (e.g., decode a PDSCH resource indicated in the DCI message) to identify the distance-based sidelink message based on the recipient UE being located within the region of interest of the UE 1.

Figure 5:
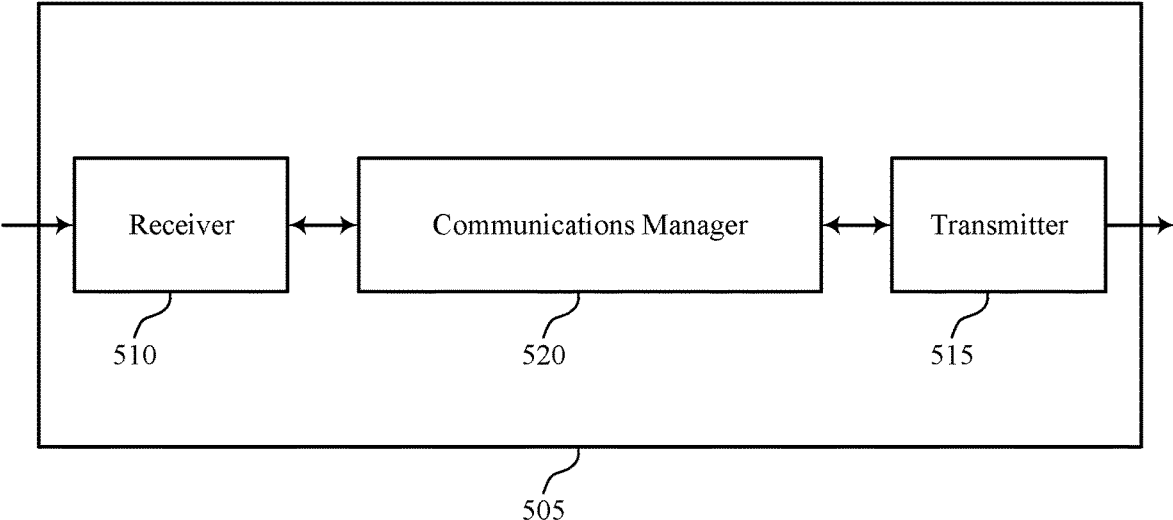
FIGS. 5 and 6 show block diagrams of devices that support techniques for access link based reliability for sidelink communications in accordance with one or more aspects of the present disclosure.

FIG. 5 shows a block diagram 500 of a device 505 that supports techniques for access link based reliability for sidelink communications in accordance with one or more aspects of the present disclosure. The device 505 may be an example of aspects of a network entity 105 as described herein. The device 505 may include a receiver 510, a transmitter 515, and a communications manager 520. The device 505 may also include a processor. Each of these components may be in communication with one another (e.g., via one or more buses).

The receiver 510 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 505. In some examples, the receiver 510 may support obtaining information by receiving signals via one or more antennas. Additionally, or alternatively, the receiver 510 may support obtaining information by receiving signals via one or more wired (e.g., electrical, fiber optic) interfaces, wireless interfaces, or any combination thereof.

The transmitter 515 may provide a means for outputting (e.g., transmitting, providing, conveying, sending) information generated by other components of the device 505. For example, the transmitter 515 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 515 may support outputting information by transmitting signals via one or more antennas. Additionally, or alternatively, the transmitter 515 may support outputting information by transmitting signals via one or more wired (e.g., electrical, fiber optic) interfaces, wireless interfaces, or any combination thereof. In some examples, the transmitter 515 and the receiver 510 may be co-located in a transceiver, which may include or be coupled with a modem.

The communications manager 520, the receiver 510, the transmitter 515, or various combinations thereof or various components thereof may be examples of means for performing various aspects of techniques for access link based reliability for sidelink communications as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a serving network entity in accordance with examples as disclosed herein. For example, the communications manager 520 is capable of, configured to, or operable to support a means for receiving, from a UE and via an access link, a distance-based sidelink message including an indication of a region of interest around the UE, where the distance-based sidelink message is for relay of the distance-based sidelink message to one or more UEs within the region of interest. The communications manager 520 is capable of, configured to, or operable to support a means for selecting one or more target network entities that provide service to at least a portion of the region of interest around the UE. The communications manager 520 is capable of, configured to, or operable to support a means for transmitting, via a backhaul link, the distance-based sidelink message to the one or more target network entities for relay of the distance-based sidelink message to one or more UEs within the region of interest.

Additionally, or alternatively, the communications manager 520 may support wireless communications at a target network entity in accordance with examples as disclosed herein. For example, the communications manager 520 is capable of, configured to, or operable to support a means for receiving, from a serving network entity and via a backhaul link, a distance-based sidelink message relayed from a UE, where the distance-based sidelink message is for relay of the distance-based sidelink message to one or more UEs within a region of interest. The communications manager 520 is capable of, configured to, or operable to support a means for transmitting, to the one or more UEs and via an access link, a control message indicating the region of interest and a resource in which transmission of the distance-based sidelink message is scheduled. The communications manager 520 is capable of, configured to, or operable to support a means for transmitting, to the one or more UEs and via the access link, the distance-based sidelink message using the resource.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for reduced processing, reduced power consumption, and more efficient utilization of communication resources.

Figure 6:
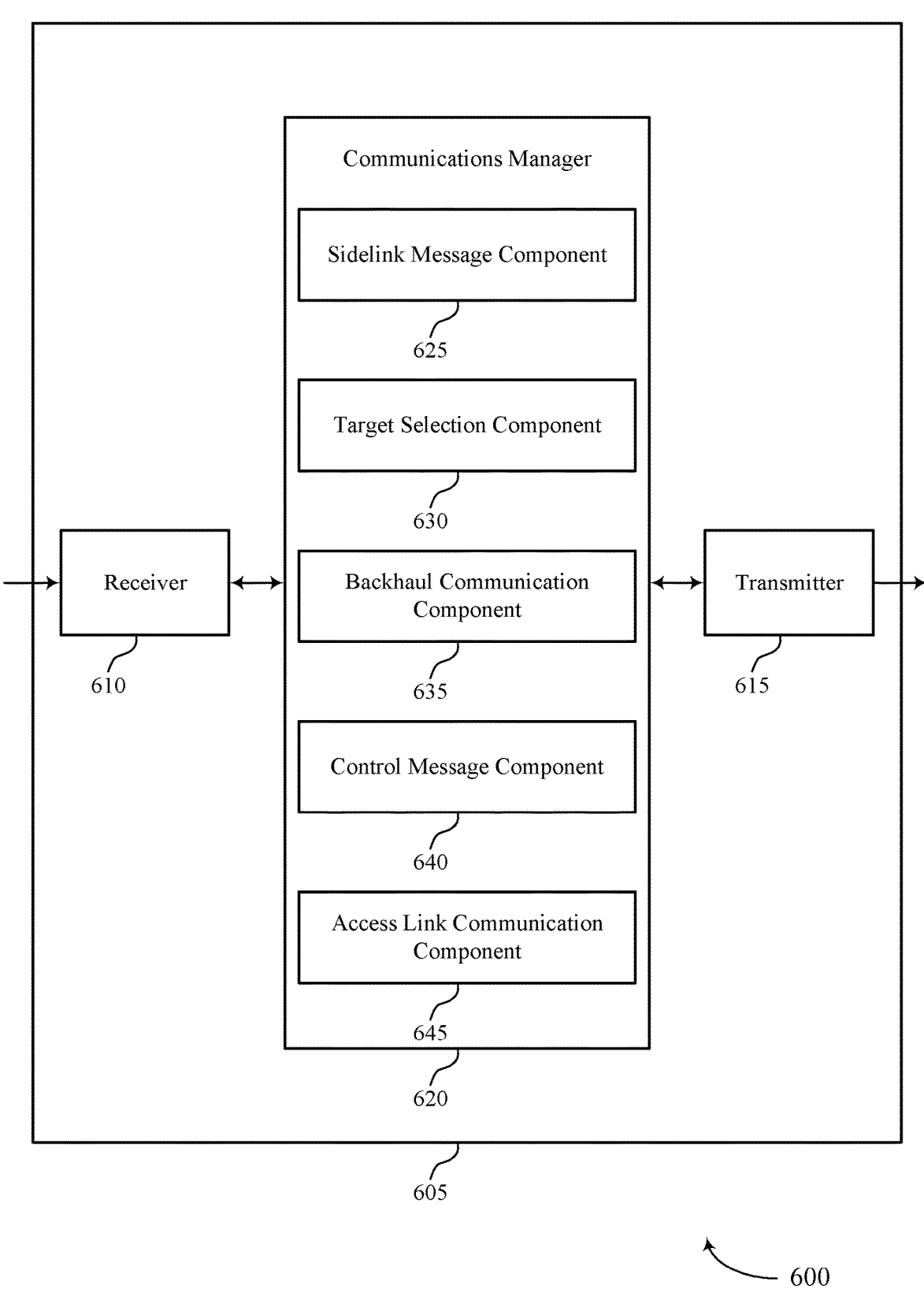

FIG. 6 shows a block diagram 600 of a device 605 that supports techniques for access link based reliability for sidelink communications in accordance with one or more aspects of the present disclosure. The device 605 may be an example of aspects of a device 505 or a network entity 105 as described herein. The device 605 may include a receiver 610, a transmitter 615, and a communications manager 620. The device 605 may also include a processor. Each of these components may be in communication with one another (e.g., via one or more buses).

The receiver 610 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 605. In some examples, the receiver 610 may support obtaining information by receiving signals via one or more antennas. Additionally, or alternatively, the receiver 610 may support obtaining information by receiving signals via one or more wired (e.g., electrical, fiber optic) interfaces, wireless interfaces, or any combination thereof.

The transmitter 615 may provide a means for outputting (e.g., transmitting, providing, conveying, sending) information generated by other components of the device 605. For example, the transmitter 615 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 615 may support outputting information by transmitting signals via one or more antennas. Additionally, or alternatively, the transmitter 615 may support outputting information by transmitting signals via one or more wired (e.g., electrical, fiber optic) interfaces, wireless interfaces, or any combination thereof. In some examples, the transmitter 615 and the receiver 610 may be co-located in a transceiver, which may include or be coupled with a modem.

The device 605, or various components thereof, may be an example of means for performing various aspects of techniques for access link based reliability for sidelink communications as described herein. For example, the communications manager 620 may include a sidelink message component 625, a target selection component 630, a backhaul communication component 635, a control message component 640, an access link communication component 645, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a serving network entity in accordance with examples as disclosed herein. The sidelink message component 625 is capable of, configured to, or operable to support a means for receiving, from a UE and via an access link, a distance-based sidelink message including an indication of a region of interest around the UE, where the distance-based sidelink message is for relay of the distance-based sidelink message to one or more UEs within the region of interest. The target selection component 630 is capable of, configured to, or operable to support a means for selecting one or more target network entities that provide service to at least a portion of the region of interest around the UE. The backhaul communication component 635 is capable of, configured to, or operable to support a means for transmitting, via a backhaul link, the distance-based sidelink message to the one or more target network entities for relay of the distance-based sidelink message to one or more UEs within the region of interest.

Additionally, or alternatively, the communications manager 620 may support wireless communications at a target network entity in accordance with examples as disclosed herein. The sidelink message component 625 is capable of, configured to, or operable to support a means for receiving, from a serving network entity and via a backhaul link, a distance-based sidelink message relayed from a UE, where the distance-based sidelink message is for relay of the distance-based sidelink message to one or more UEs within a region of interest. The control message component 640 is capable of, configured to, or operable to support a means for transmitting, to the one or more UEs and via an access link, a control message indicating the region of interest and a resource in which transmission of the distance-based sidelink message is scheduled. The access link communication component 645 is capable of, configured to, or operable to support a means for transmitting, to the one or more UEs and via the access link, the distance-based sidelink message using the resource.

Figure 7:
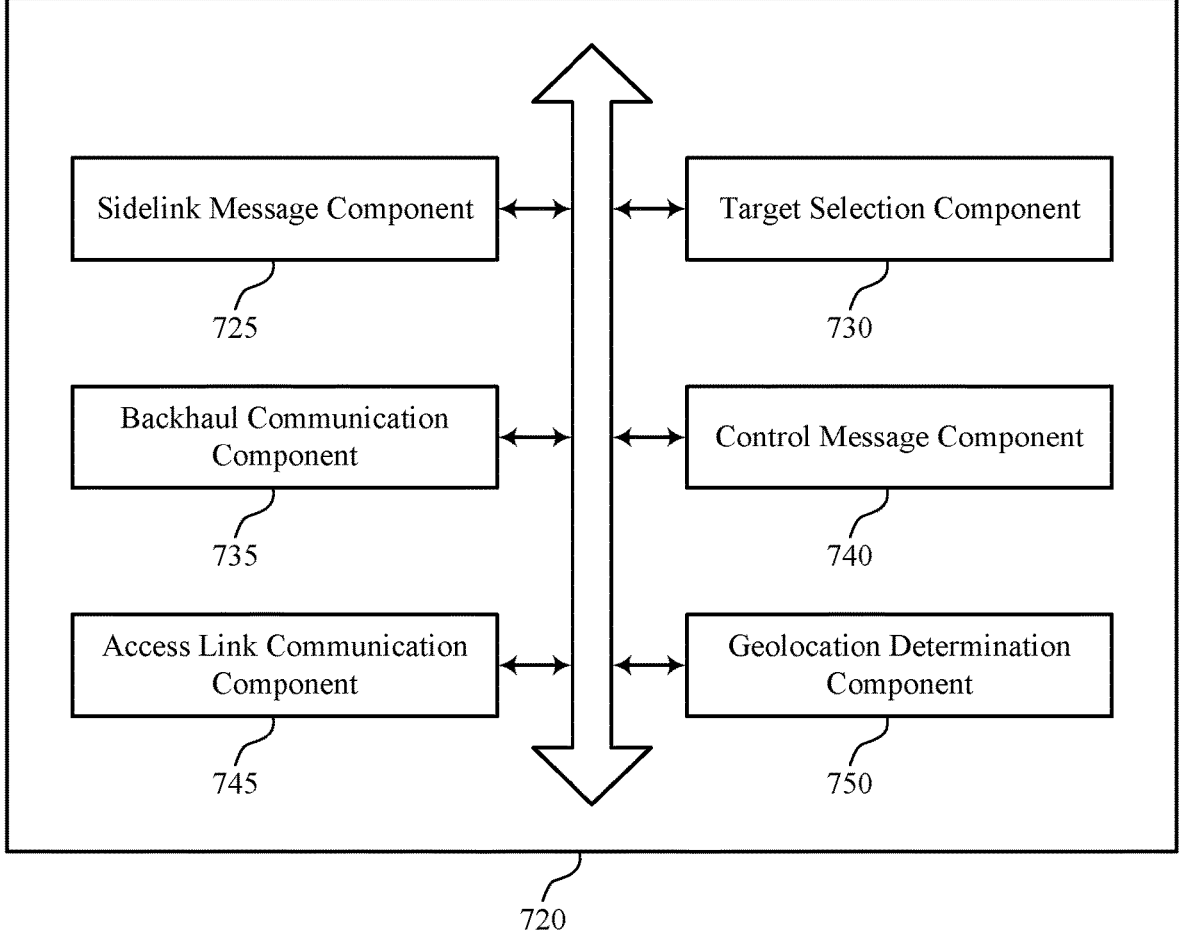
FIG. 7 shows a block diagram of a communications manager that supports techniques for access link based reliability for sidelink communications in accordance with one or more aspects of the present disclosure.

FIG. 7 shows a block diagram 700 of a communications manager 720 that supports techniques for access link based reliability for sidelink communications in accordance with one or more aspects of the present disclosure. The communications manager 720 may be an example of aspects of a communications manager 520, a communications manager 620, or both, as described herein. The communications manager 720, or various components thereof, may be an example of means for performing various aspects of techniques for access link based reliability for sidelink communications as described herein. For example, the communications manager 720 may include a sidelink message component 725, a target selection component 730, a backhaul communication component 735, a control message component 740, an access link communication component 745, a geolocation determination component 750, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 720 may support wireless communications at a serving network entity in accordance with examples as disclosed herein. The sidelink message component 725 is capable of, configured to, or operable to support a means for receiving, from a UE and via an access link, a distance-based sidelink message including an indication of a region of interest around the UE, where the distance-based sidelink message is for relay of the distance-based sidelink message to one or more UEs within the region of interest. The target selection component 730 is capable of, configured to, or operable to support a means for selecting one or more target network entities that provide service to at least a portion of the region of interest around the UE. The backhaul communication component 735 is capable of, configured to, or operable to support a means for transmitting, via a backhaul link, the distance-based sidelink message to the one or more target network entities for relay of the distance-based sidelink message to one or more UEs within the region of interest.

In some examples, to support receiving the distance-based sidelink message, the sidelink message component 725 is capable of, configured to, or operable to support a means for receiving the distance-based sidelink message including an indication of a distance relative to a geolocation of the UE, where the distance-based sidelink message is for relay to one or more UEs within the distance.

In some examples, to support receiving the distance-based sidelink message, the sidelink message component 725 is capable of, configured to, or operable to support a means for receiving the distance-based sidelink message including an indication of a quantity of one or more zones around the UE, where the distance-based sidelink message is for relay to one or more UEs within each zone of the quantity of one or more zones.

In some examples, the geolocation determination component 750 is capable of, configured to, or operable to support a means for determining a current geolocation of the UE based on receiving the distance-based sidelink message, where selecting the one or more target network entities is based on the current geolocation of the UE.

In some examples, to support determining the current geolocation of the UE, the geolocation determination component 750 is capable of, configured to, or operable to support a means for performing a positioning technique to determine the current geolocation of the UE, where the positioning technique includes uplink positioning, downlink positioning, or both.

In some examples, the geolocation determination component 750 is capable of, configured to, or operable to support a means for receiving, from the UE, a control signal indicating a current zone of the UE, a determined geolocation of the UE, or both, where determining the current geolocation of the UE is based on receiving the control signal.

In some examples, to support selecting the one or more target network entities, the target selection component 730 is capable of, configured to, or operable to support a means for selecting one or more geolocations for relaying the distance-based sidelink message based on a current geolocation of the UE, a distance within which the distance-based sidelink message is to be relayed, or both.

In some examples, the geolocation determination component 750 is capable of, configured to, or operable to support a means for determining a coverage map including geolocation information related to one or more geographic areas serviced by the serving network entity, the one or more target network entities, or both, where selecting the one or more geolocations is based on the coverage map.

In some examples, to support selecting the one or more target network entities, the target selection component 730 is capable of, configured to, or operable to support a means for determining one or more zone identifiers for one or more locations for relaying the distance-based sidelink message based on a zone identifier for the UE, where determining the one or more zone identifiers for one or more locations is based on a coverage map.

In some examples, to support transmitting the distance-based sidelink message, the backhaul communication component 735 is capable of, configured to, or operable to support a means for transmitting the distance-based sidelink message to the one or more target network entities located in one or more locations associated with one or more zone identifiers.

In some examples, to support transmitting the distance-based sidelink message, the backhaul communication component 735 is capable of, configured to, or operable to support a means for transmitting the distance-based sidelink message to the one or more target network entities, the distance-based sidelink message including a quality of service threshold for relay of the distance-based sidelink message to one or more UEs within the region of interest.

Additionally, or alternatively, the communications manager 720 may support wireless communications at a target network entity in accordance with examples as disclosed herein. In some examples, the sidelink message component 725 is capable of, configured to, or operable to support a means for receiving, from a serving network entity and via a backhaul link, a distance-based sidelink message relayed from a UE, where the distance-based sidelink message is for relay of the distance-based sidelink message to one or more UEs within a region of interest. The control message component 740 is capable of, configured to, or operable to support a means for transmitting, to the one or more UEs and via an access link, a control message indicating the region of interest and a resource in which transmission of the distance-based sidelink message is scheduled. The access link communication component 745 is capable of, configured to, or operable to support a means for transmitting, to the one or more UEs and via the access link, the distance-based sidelink message using the resource.

In some examples, to support transmitting the control message, the control message component 740 is capable of, configured to, or operable to support a means for transmitting the control message that is scrambled with a radio network temporary identifier that is associated with the region of interest.

In some examples, to support transmitting the control message, the control message component 740 is capable of, configured to, or operable to support a means for transmitting the control message including an indication of a current geolocation of the UE.

In some examples, to support transmitting the control message, the control message component 740 is capable of, configured to, or operable to support a means for transmitting the control message including an indication of a distance relative to a current geolocation of the UE, where the distance-based sidelink message is for relay to the one or more UEs within the distance.

In some examples, to support transmitting the distance-based sidelink message, the access link communication component 745 is capable of, configured to, or operable to support a means for transmitting a physical downlink shared channel including the distance-based sidelink message using the resource.

Figure 8:
FIG. 8 shows a diagram of a system including a device that supports techniques for access link based reliability for sidelink communications in accordance with one or more aspects of the present disclosure.

FIG. 8 shows a diagram of a system 800 including a device 805 that supports techniques for access link based reliability for sidelink communications in accordance with one or more aspects of the present disclosure. The device 805 may be an example of or include the components of a device 505, a device 605, or a network entity 105 as described herein. The device 805 may communicate with one or more network entities 105, one or more UEs 115, or any combination thereof, which may include communications over one or more wired interfaces, over one or more wireless interfaces, or any combination thereof. The device 805 may include components that support outputting and obtaining communications, such as a communications manager 820, a transceiver 810, an antenna 815, a memory 825, code 830, and a processor 835. These components may be in electronic communication or otherwise coupled (e.g., operatively, communicatively, functionally, electronically, electrically) via one or more buses (e.g., a bus 840).

The transceiver 810 may support bi-directional communications via wired links, wireless links, or both as described herein. In some examples, the transceiver 810 may include a wired transceiver and may communicate bi-directionally with another wired transceiver. Additionally, or alternatively, in some examples, the transceiver 810 may include a wireless transceiver and may communicate bi-directionally with another wireless transceiver. In some examples, the device 805 may include one or more antennas 815, which may be capable of transmitting or receiving wireless transmissions (e.g., concurrently). The transceiver 810 may also include a modem to modulate signals, to provide the modulated signals for transmission (e.g., by one or more antennas 815, by a wired transmitter), to receive modulated signals (e.g., from one or more antennas 815, from a wired receiver), and to demodulate signals. In some implementations, the transceiver 810 may include one or more interfaces, such as one or more interfaces coupled with the one or more antennas 815 that are configured to support various receiving or obtaining operations, or one or more interfaces coupled with the one or more antennas 815 that are configured to support various transmitting or outputting operations, or a combination thereof. In some implementations, the transceiver 810 may include or be configured for coupling with one or more processors or memory components that are operable to perform or support operations based on received or obtained information or signals, or to generate information or other signals for transmission or other outputting, or any combination thereof. In some implementations, the transceiver 810, or the transceiver 810 and the one or more antennas 815, or the transceiver 810 and the one or more antennas 815 and one or more processors or memory components (for example, the processor 835, or the memory 825, or both), may be included in a chip or chip assembly that is installed in the device 805. In some examples, the transceiver may be operable to support communications via one or more communications links (e.g., a communication link 125, a backhaul communication link 120, a midhaul communication link 162, a fronthaul communication link 168).

The memory 825 may include RAM and ROM. The memory 825 may store computer-readable, computer-executable code 830 including instructions that, when executed by the processor 835, cause the device 805 to perform various functions described herein. The code 830 may be stored in a non-transitory computer-readable medium such as system memory or another type of memory. In some cases, the code 830 may not be directly executable by the processor 835 but may cause a computer (e.g., when compiled and executed) to perform functions described herein. In some cases, the memory 825 may contain, among other things, a BIOS which may control basic hardware or software operation such as the interaction with peripheral components or devices.

The processor 835 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 835 may be configured to operate a memory array using a memory controller. In some other cases, a memory controller may be integrated into the processor 835. The processor 835 may be configured to execute computer-readable instructions stored in a memory (e.g., the memory 825) to cause the device 805 to perform various functions (e.g., functions or tasks supporting techniques for access link based reliability for sidelink communications). For example, the device 805 or a component of the device 805 may include a processor 835 and memory 825 coupled with the processor 835, the processor 835 and memory 825 configured to perform various functions described herein. The processor 835 may be an example of a cloud-computing platform (e.g., one or more physical nodes and supporting software such as operating systems, virtual machines, or container instances) that may host the functions (e.g., by executing code 830) to perform the functions of the device 805. The processor 835 may be any one or more suitable processors capable of executing scripts or instructions of one or more software programs stored in the device 805 (such as within the memory 825). In some implementations, the processor 835 may be a component of a processing system. A processing system may generally refer to a system or series of machines or components that receives inputs and processes the inputs to produce a set of outputs (which may be passed to other systems or components of, for example, the device 805). For example, a processing system of the device 805 may refer to a system including the various other components or subcomponents of the device 805, such as the processor 835, or the transceiver 810, or the communications manager 820, or other components or combinations of components of the device 805. The processing system of the device 805 may interface with other components of the device 805, and may process information received from other components (such as inputs or signals) or output information to other components. For example, a chip or modem of the device 805 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 805 may transmit information output from the chip or modem. Additionally, or alternatively, in some implementations, the one or more interfaces may refer to an interface between the processing system of the chip or modem and a receiver, such that the device 805 may obtain information or signal inputs, and the information may be passed to the processing system. A person having ordinary skill in the art will readily recognize that a first interface also may obtain information or signal inputs, and a second interface also may output information or signal outputs.

In some examples, a bus 840 may support communications of (e.g., within) a protocol layer of a protocol stack. In some examples, a bus 840 may support communications associated with a logical channel of a protocol stack (e.g., between protocol layers of a protocol stack), which may include communications performed within a component of the device 805, or between different components of the device 805 that may be co-located or located in different locations (e.g., where the device 805 may refer to a system in which one or more of the communications manager 820, the transceiver 810, the memory 825, the code 830, and the processor 835 may be located in one of the different components or divided between different components).

In some examples, the communications manager 820 may manage aspects of communications with a core network 130 (e.g., via one or more wired or wireless backhaul links). For example, the communications manager 820 may manage the transfer of data communications for client devices, such as one or more UEs 115. In some examples, the communications manager 820 may manage communications with other network entities 105, and may include a controller or scheduler for controlling communications with ULEs 115 in cooperation with other network entities 105. In some examples, the communications manager 820 may support an X2 interface within an LTE/LTE-A wireless communications network technology to provide communication between network entities 105.

The communications manager 820 may support wireless communications at a serving network entity in accordance with examples as disclosed herein. For example, the communications manager 820 is capable of, configured to, or operable to support a means for receiving, from a UE and via an access link, a distance-based sidelink message including an indication of a region of interest around the UE, where the distance-based sidelink message is for relay of the distance-based sidelink message to one or more UEs within the region of interest. The communications manager 820 is capable of, configured to, or operable to support a means for selecting one or more target network entities that provide service to at least a portion of the region of interest around the UE. The communications manager 820 is capable of, configured to, or operable to support a means for transmitting, via a backhaul link, the distance-based sidelink message to the one or more target network entities for relay of the distance-based sidelink message to one or more UEs within the region of interest.

Additionally, or alternatively, the communications manager 820 may support wireless communications at a target network entity in accordance with examples as disclosed herein. For example, the communications manager 820 is capable of, configured to, or operable to support a means for receiving, from a serving network entity and via a backhaul link, a distance-based sidelink message relayed from a UE, where the distance-based sidelink message is for relay of the distance-based sidelink message to one or more UEs within a region of interest. The communications manager 820 is capable of, configured to, or operable to support a means for transmitting, to the one or more UEs and via an access link, a control message indicating the region of interest and a resource in which transmission of the distance-based sidelink message is scheduled. The communications manager 820 is capable of, configured to, or operable to support a means for transmitting, to the one or more UEs and via the access link, the distance-based sidelink message using the resource.

By including or configuring the communications manager 820 in accordance with examples as described herein, the device 805 may support techniques for improved communication reliability, reduced latency, improved user experience related to reduced processing, reduced power consumption, more efficient utilization of communication resources, and improved coordination between devices.

In some examples, the communications manager 820 may be configured to perform various operations (e.g., receiving, obtaining, monitoring, outputting, transmitting) using or otherwise in cooperation with the transceiver 810, the one or more antennas 815 (e.g., where applicable), or any combination thereof. Although the communications manager 820 is illustrated as a separate component, in some examples, one or more functions described with reference to the communications manager 820 may be supported by or performed by the transceiver 810, the processor 835, the memory 825, the code 830, or any combination thereof. For example, the code 830 may include instructions executable by the processor 835 to cause the device 805 to perform various aspects of techniques for access link based reliability for sidelink communications as described herein, or the processor 835 and the memory 825 may be otherwise configured to perform or support such operations.

Figure 9:
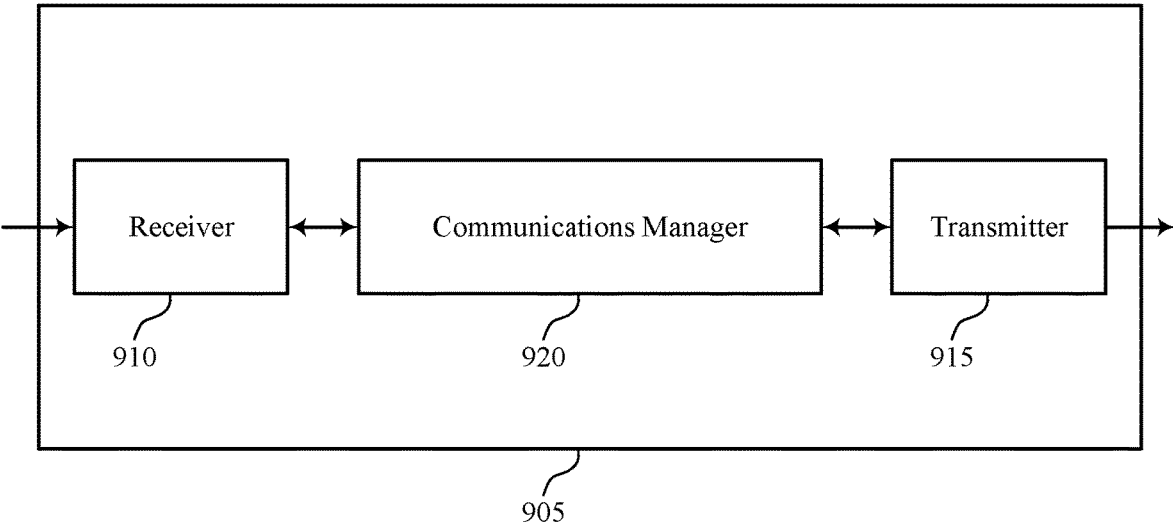
FIGS. 9 and 10 show block diagrams of devices that support techniques for access link based reliability for sidelink communications in accordance with one or more aspects of the present disclosure.

FIG. 9 shows a block diagram 900 of a device 905 that supports techniques for access link based reliability for sidelink communications in accordance with one or more aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for access link based reliability for sidelink communications). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for access link based reliability for sidelink communications). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of techniques for access link based reliability for sidelink communications as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a UE in accordance with examples as disclosed herein. For example, the communications manager 920 is capable of, configured to, or operable to support a means for receiving, from a target network entity and via an access link, a control message indicating a region of interest and a resource in which transmission of a distance-based sidelink message is scheduled, where the distance-based sidelink message is for relay of the distance-based sidelink message from a transmitting UE to one or more UEs within the region of interest. The communications manager 920 is capable of, configured to, or operable to support a means for receiving, from the target network entity and via the access link, the distance-based sidelink message using the resource. The communications manager 920 is capable of, configured to, or operable to support a means for decoding the resource to identify the distance-based sidelink message based on the UE being located within the region of interest.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for reduced processing, reduced power consumption, and more efficient utilization of communication resources.

Figure 10:
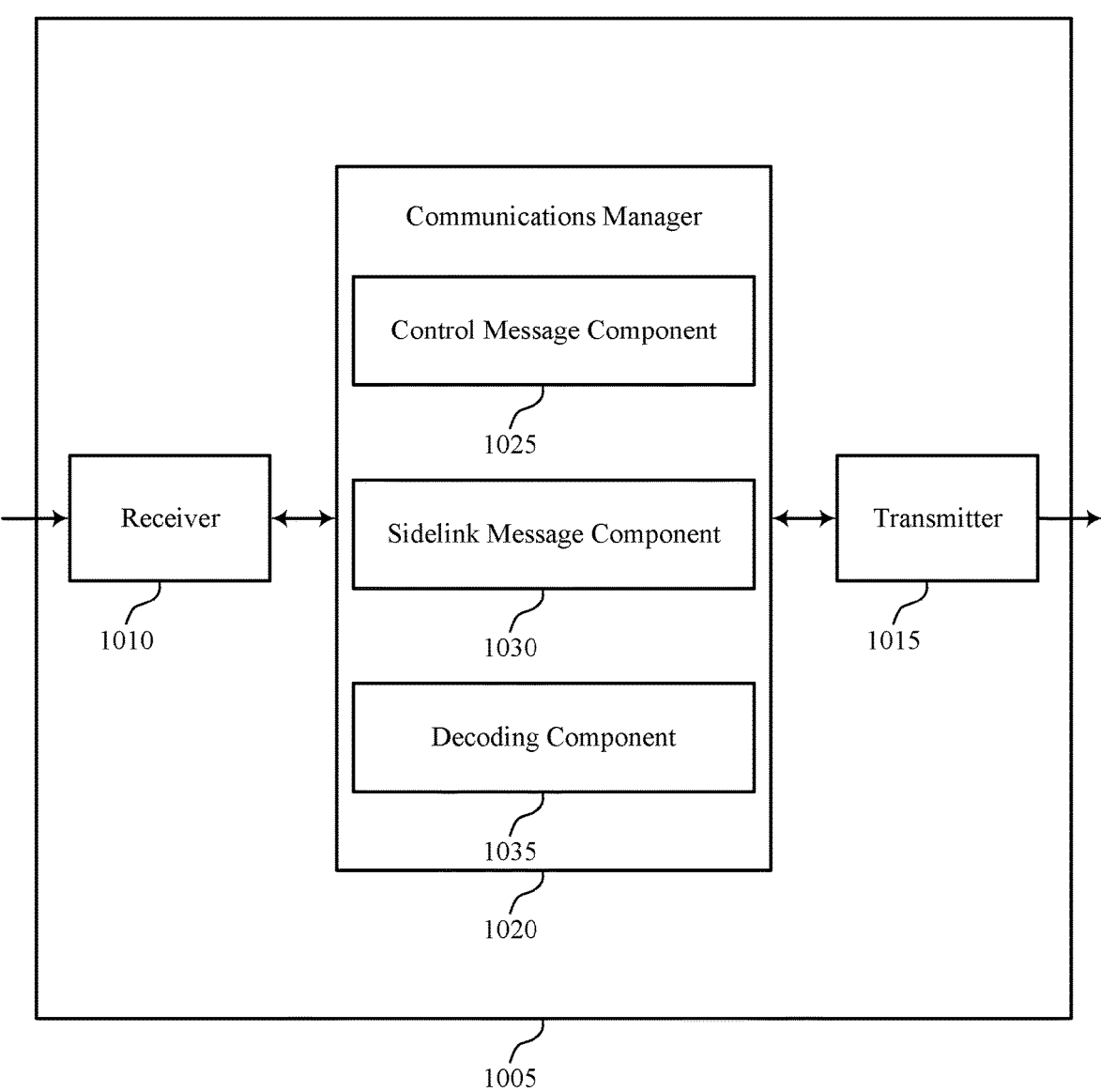

FIG. 10 shows a block diagram 1000 of a device 1005 that supports techniques for access link based reliability for sidelink communications in accordance with one or more aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for access link based reliability for sidelink communications). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for access link based reliability for sidelink communications). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of techniques for access link based reliability for sidelink communications as described herein. For example, the communications manager 1020 may include a control message component 1025, a sidelink message component 1030, a decoding component 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a UE in accordance with examples as disclosed herein. The control message component 1025 is capable of, configured to, or operable to support a means for receiving, from a target network entity and via an access link, a control message indicating a region of interest and a resource in which transmission of a distance-based sidelink message is scheduled, where the distance-based sidelink message is for relay of the distance-based sidelink message from a transmitting UE to one or more UEs within the region of interest. The sidelink message component 1030 is capable of, configured to, or operable to support a means for receiving, from the target network entity and via the access link, the distance-based sidelink message using the resource. The decoding component 1035 is capable of, configured to, or operable to support a means for decoding the resource to identify the distance-based sidelink message based on the UE being located within the region of interest.

Figure 11:
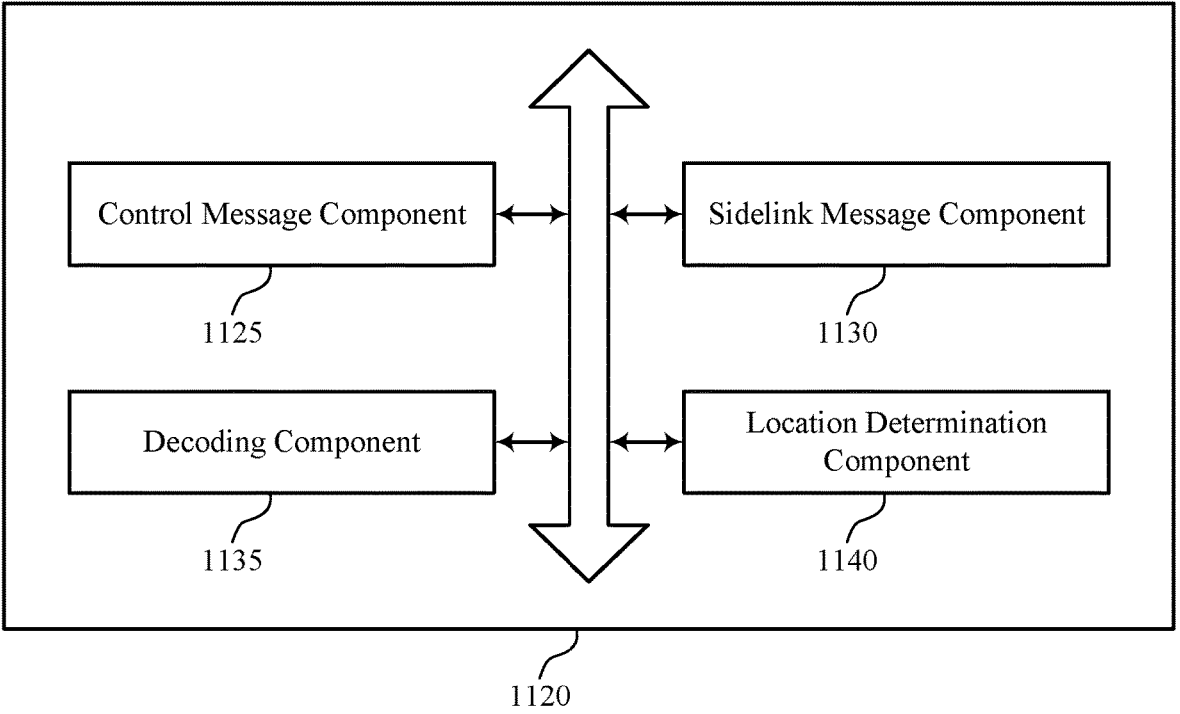
FIG. 11 shows a block diagram of a communications manager that supports techniques for access link based reliability for sidelink communications in accordance with one or more aspects of the present disclosure.
Figure 11:
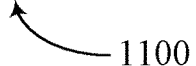

FIG. 11 shows a block diagram 1100 of a communications manager 1120 that supports techniques for access link based reliability for sidelink communications in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of techniques for access link based reliability for sidelink communications as described herein. For example, the communications manager 1120 may include a control message component 1125, a sidelink message component 1130, a decoding component 1135, a location determination component 1140, or any combination thereof. Each of these components may communicate, directly or indirectly, with one another (e.g., via one or more buses).

The communications manager 1120 may support wireless communications at a UE in accordance with examples as disclosed herein. The control message component 1125 is capable of, configured to, or operable to support a means for receiving, from a target network entity and via an access link, a control message indicating a region of interest and a resource in which transmission of a distance-based sidelink message is scheduled, where the distance-based sidelink message is for relay of the distance-based sidelink message from a transmitting UE to one or more UEs within the region of interest. The sidelink message component 1130 is capable of, configured to, or operable to support a means for receiving, from the target network entity and via the access link, the distance-based sidelink message using the resource. The decoding component 1135 is capable of, configured to, or operable to support a means for decoding the resource to identify the distance-based sidelink message based on the UE being located within the region of interest.

In some examples, the decoding component 1135 is capable of, configured to, or operable to support a means for receiving an indication of a radio network temporary identifier associated with the region of interest. In some examples, the decoding component 1135 is capable of, configured to, or operable to support a means for descrambling the control message using the radio network temporary identifier based on the UE being located within the region of interest.

In some examples, the location determination component 1140 is capable of, configured to, or operable to support a means for determining whether the UE is located within a distance relative to a current geolocation of the transmitting UE, where decoding the resource is based on the UE being located within the distance relative to the current geolocation of the transmitting UE.

Figure 12:
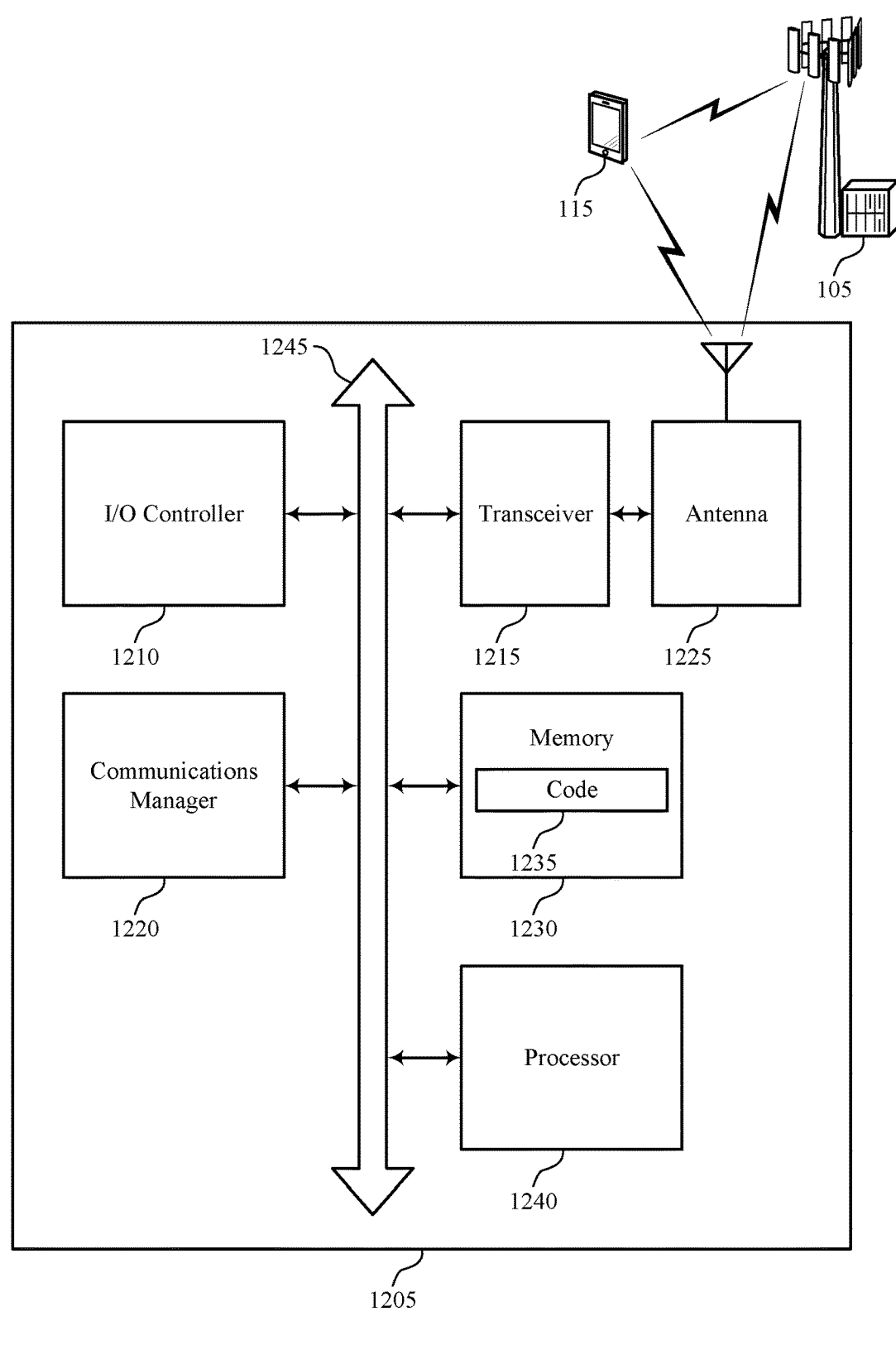
FIG. 12 shows a diagram of a system including a device that supports techniques for access link based reliability for sidelink communications in accordance with one or more aspects of the present disclosure.

FIG. 12 shows a diagram of a system 1200 including a device 1205 that supports techniques for access link based reliability for sidelink communications in accordance with one or more aspects of the present disclosure. The device 1205 may be an example of or include the components of a device 905, a device 1005, or a UE 115 as described herein. The device 1205 may communicate (e.g., wirelessly) with one or more network entities 105, one or more UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for access link based reliability for sidelink communications). For example, the device 1205 or a component of the device 1205 may include a processor 1240 and memory 1230 coupled with or to the processor 1240, the processor 1240 and memory 1230 configured to perform various functions described herein.

The communications manager 1220 may support wireless communications at a UE in accordance with examples as disclosed herein. For example, the communications manager 1220 is capable of, configured to, or operable to support a means for receiving, from a target network entity and via an access link, a control message indicating a region of interest and a resource in which transmission of a distance-based sidelink message is scheduled, where the distance-based sidelink message is for relay of the distance-based sidelink message from a transmitting UE to one or more UEs within the region of interest. The communications manager 1220 is capable of, configured to, or operable to support a means for receiving, from the target network entity and via the access link, the distance-based sidelink message using the resource. The communications manager 1220 is capable of, configured to, or operable to support a means for decoding the resource to identify the distance-based sidelink message based on the UE being located within the region of interest.

By including or configuring the communications manager 1220 in accordance with examples as described herein, the device 1205 may support techniques for improved communication reliability, reduced latency, improved user experience related to reduced processing, reduced power consumption, more efficient utilization of communication resources, improved coordination between devices, and improved utilization of processing capability.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for access link based reliability for sidelink communications as described herein, or the processor 1240 and the memory 1230 may be otherwise configured to perform or support such operations.

FIG. 13 shows a flowchart illustrating a method 1300 that supports techniques for access link based reliability for sidelink communications in accordance with aspects of the present disclosure. The operations of the method 1300 may be implemented by a network entity or its components as described herein. For example, the operations of the method 1300 may be performed by a network entity as described with reference to FIGS. 1 through 8. In some examples, a network entity may execute a set of instructions to control the functional elements of the wireless network entity to perform the described functions. Additionally, or alternatively, the wireless network entity may perform aspects of the described functions using special-purpose hardware.

At 1305, the method may include receiving, from a UE and via an access link, a distance-based sidelink message including an indication of a region of interest around the UE, where the distance-based sidelink message is for relay of the distance-based sidelink message to one or more UEs within the region of interest. The operations of 1305 may be performed in accordance with examples as disclosed herein. In some examples, aspects of the operations of 1305 may be performed by a sidelink message component 725 as described with reference to FIG. 7.

At 1310, the method may include selecting one or more target network entities that provide service to at least a portion of the region of interest around the UE. The operations of 1310 may be performed in accordance with examples as disclosed herein. In some examples, aspects of the operations of 1310 may be performed by a target selection component 730 as described with reference to FIG. 7.

At 1315, the method may include transmitting, via a backhaul link, the distance-based sidelink message to the one or more target network entities for relay of the distance-based sidelink message to one or more UEs within the region of interest. The operations of 1315 may be performed in accordance with examples as disclosed herein. In some examples, aspects of the operations of 1315 may be performed by a backhaul communication component 735 as described with reference to FIG. 7.

FIG. 14 shows a flowchart illustrating a method 1400 that supports techniques for access link based reliability for sidelink communications in accordance with aspects of the present disclosure. The operations of the method 1400 may be implemented by a network entity or its components as described herein. For example, the operations of the method 1400 may be performed by a network entity as described with reference to FIGS. 1 through 8. In some examples, a network entity may execute a set of instructions to control the functional elements of the wireless network entity to perform the described functions. Additionally, or alternatively, the wireless network entity may perform aspects of the described functions using special-purpose hardware.

At 1405, the method may include receiving, from a UE and via an access link, a distance-based sidelink message including an indication of a region of interest around the UE, where the distance-based sidelink message is for relay of the distance-based sidelink message to one or more UEs within the region of interest. The operations of 1405 may be performed in accordance with examples as disclosed herein. In some examples, aspects of the operations of 1405 may be performed by a sidelink message component 725 as described with reference to FIG. 7.

At 1410, the method may include determining a current geolocation of the UE based on receiving the distance-based sidelink message. The operations of 1410 may be performed in accordance with examples as disclosed herein. In some examples, aspects of the operations of 1410 may be performed by a geolocation determination component 750 as described with reference to FIG. 7.

At 1415, the method may include selecting one or more target network entities that provide service to at least a portion of the region of interest around the UE. In some examples, selecting the one or more target network entities is based on the current geolocation of the UE. The operations of 1415 may be performed in accordance with examples as disclosed herein. In some examples, aspects of the operations of 1415 may be performed by a target selection component 730 as described with reference to FIG. 7.

At 1420, the method may include transmitting, via a backhaul link, the distance-based sidelink message to the one or more target network entities for relay of the distance-based sidelink message to one or more UEs within the region of interest. The operations of 1420 may be performed in accordance with examples as disclosed herein. In some examples, aspects of the operations of 1420 may be performed by a backhaul communication component 735 as described with reference to FIG. 7.

FIG. 15 shows a flowchart illustrating a method 1500 that supports techniques for access link based reliability for sidelink communications in accordance with aspects of the present disclosure. The operations of the method 1500 may be implemented by a network entity or its components as described herein. For example, the operations of the method 1500 may be performed by a network entity as described with reference to FIGS. 1 through 8. In some examples, a network entity may execute a set of instructions to control the functional elements of the wireless network entity to perform the described functions. Additionally, or alternatively, the wireless network entity may perform aspects of the described functions using special-purpose hardware.

At 1505, the method may include receiving, from a serving network entity and via a backhaul link, a distance-based sidelink message relayed from a UE, where the distance-based sidelink message is for relay of the distance-based sidelink message to one or more UEs within a region of interest. The operations of 1505 may be performed in accordance with examples as disclosed herein. In some examples, aspects of the operations of 1505 may be performed by a sidelink message component 725 as described with reference to FIG. 7.

At 1510, the method may include transmitting, to the one or more UEs and via an access link, a control message indicating the region of interest and a resource in which transmission of the distance-based sidelink message is scheduled. The operations of 1510 may be performed in accordance with examples as disclosed herein. In some examples, aspects of the operations of 1510 may be performed by a control message component 740 as described with reference to FIG. 7.

At 1515, the method may include transmitting, to the one or more UEs and via the access link, the distance-based sidelink message using the resource. The operations of 1515 may be performed in accordance with examples as disclosed herein. In some examples, aspects of the operations of 1515 may be performed by an access link communication component 745 as described with reference to FIG. 7.

FIG. 16 shows a flowchart illustrating a method 1600 that supports techniques for access link based reliability for sidelink communications in accordance with aspects of the present disclosure. The operations of the method 1600 may be implemented by a network entity or its components as described herein. For example, the operations of the method 1600 may be performed by a network entity as described with reference to FIGS. 1 through 8. In some examples, a network entity may execute a set of instructions to control the functional elements of the wireless network entity to perform the described functions. Additionally, or alternatively, the wireless network entity may perform aspects of the described functions using special-purpose hardware.

At 1605, the method may include receiving, from a serving network entity and via a backhaul link, a distance-based sidelink message relayed from a UE, where the distance-based sidelink message is for relay of the distance-based sidelink message to one or more UEs within a region of interest. The operations of 1605 may be performed in accordance with examples as disclosed herein. In some examples, aspects of the operations of 1605 may be performed by a sidelink message component 725 as described with reference to FIG. 7.

At 1610, the method may include transmitting a control message including an indication of a distance relative to a current geolocation of the UE, where the distance-based sidelink message is for relay to the one or more UEs within the distance. The operations of 1610 may be performed in accordance with examples as disclosed herein. In some examples, aspects of the operations of 1610 may be performed by a control message component 740 as described with reference to FIG. 7.

At 1615, the method may include transmitting, to the one or more UEs and via the access link, the distance-based sidelink message using the resource. The operations of 1615 may be performed in accordance with examples as disclosed herein. In some examples, aspects of the operations of 1615 may be performed by an access link communication component 745 as described with reference to FIG. 7.

FIG. 17 shows a flowchart illustrating a method 1700 that supports techniques for access link based reliability for sidelink communications in accordance with aspects of the present disclosure. The operations of the method 1700 may be implemented by a UE or its components as described herein. For example, the operations of the method 1700 may be performed by a UE 115 as described with reference to FIGS. 1 through 4 and 9 through 12. In some examples, a UE may execute a set of instructions to control the functional elements of the wireless UE to perform the described functions. Additionally, or alternatively, the wireless UE may perform aspects of the described functions using special-purpose hardware.

At 1705, the method may include receiving, from a target network entity and via an access link, a control message indicating a region of interest and a resource in which transmission of a distance-based sidelink message is scheduled, where the distance-based sidelink message is for relay of the distance-based sidelink message from a transmitting UE to one or more UEs within the region of interest. The operations of 1705 may be performed in accordance with examples as disclosed herein. In some examples, aspects of the operations of 1705 may be performed by a control message component 1125 as described with reference to FIG. 11.

At 1710, the method may include receiving, from the target network entity and via the access link, the distance-based sidelink message using the resource. The operations of 1710 may be performed in accordance with examples as disclosed herein. In some examples, aspects of the operations of 1710 may be performed by a sidelink message component 1130 as described with reference to FIG. 11.

At 1715, the method may include decoding the resource to identify the distance-based sidelink message based on the UE being located within the region of interest. The operations of 1715 may be performed in accordance with examples as disclosed herein. In some examples, aspects of the operations of 1715 may be performed by a decoding component 1135 as described with reference to FIG. 11.

FIG. 18 shows a flowchart illustrating a method 1800 that supports techniques for access link based reliability for sidelink communications in accordance with aspects of the present disclosure. The operations of the method 1800 may be implemented by a UE or its components as described herein. For example, the operations of the method 1800 may be performed by a UE 115 as described with reference to FIGS. 1 through 4 and 9 through 12. In some examples, a UE may execute a set of instructions to control the functional elements of the wireless UE to perform the described functions. Additionally, or alternatively, the wireless UE may perform aspects of the described functions using special-purpose hardware.

At 1805, the method may include receiving, from a target network entity and via an access link, a control message indicating a region of interest and a resource in which transmission of a distance-based sidelink message is scheduled, where the distance-based sidelink message is for relay of the distance-based sidelink message from a transmitting UE to one or more UEs within the region of interest. The operations of 1805 may be performed in accordance with examples as disclosed herein. In some examples, aspects of the operations of 1805 may be performed by a control message component 1125 as described with reference to FIG. 11.

At 1810, the method may include receiving, from the target network entity and via the access link, the distance-based sidelink message using the resource. The operations of 1810 may be performed in accordance with examples as disclosed herein. In some examples, aspects of the operations of 1810 may be performed by a sidelink message component 1130 as described with reference to FIG. 11.

At 1815, the method may include receiving an indication of a radio network temporary identifier associated with the region of interest. The operations of 1815 may be performed in accordance with examples as disclosed herein. In some examples, aspects of the operations of 1815 may be performed by a decoding component 1135 as described with reference to FIG. 11.

At 1820, the method may include descrambling the control message using the radio network temporary identifier based on the UE being located within the region of interest. The operations of 1820 may be performed in accordance with examples as disclosed herein. In some examples, aspects of the operations of 1820 may be performed by a decoding component 1135 as described with reference to FIG. 11.

At 1825, the method may include decoding the resource to identify the distance-based sidelink message based on the UE being located within the region of interest. The operations of 1825 may be performed in accordance with examples as disclosed herein. In some examples, aspects of the operations of 1825 may be performed by a decoding component 1135 as described with reference to FIG. 11.

The following provides an overview of aspects of the present disclosure:

Aspect 1: A method for wireless communications at a serving network entity, comprising: receiving, from a UE and via an access link, a distance-based sidelink message comprising an indication of a region of interest around the UE, wherein the distance-based sidelink message is for relay of the distance-based sidelink message to one or more UEs within the region of interest; selecting one or more target network entities that provide service to at least a portion of the region of interest around the UE; and transmitting, via a backhaul link, the distance-based sidelink message to the one or more target network entities for relay of the distance-based sidelink message to one or more UEs within the region of interest.

Aspect 2: The method of aspect 1, wherein receiving the distance-based sidelink message comprises: receiving the distance-based sidelink message comprising an indication of a distance relative to a geolocation of the UE, wherein the distance-based sidelink message is for relay to one or more UEs within the distance.

Aspect 3: The method of any of aspects 1 through 2, wherein receiving the distance-based sidelink message comprises: receiving the distance-based sidelink message comprising an indication of a quantity of one or more zones around the UE, wherein the distance-based sidelink message is for relay to one or more UEs within each zone of the quantity of one or more zones.

Aspect 4: The method of any of aspects 1 through 3, further comprising: determining a current geolocation of the UE based at least in part on receiving the distance-based sidelink message, wherein selecting the one or more target network entities is based at least in part on the current geolocation of the UE.

Aspect 5: The method of aspect 4, wherein determining the current geolocation of the UE comprises: performing a positioning technique to determine the current geolocation of the UE, wherein the positioning technique comprises uplink positioning, downlink positioning, or both.

Aspect 6: The method of any of aspects 4 through 5, further comprising: receiving, from the UE, a control signal indicating a current zone of the UE, a determined geolocation of the UE, or both, wherein determining the current geolocation of the UE is based at least in part on receiving the control signal.

Aspect 7: The method of any of aspects 1 through 6, wherein selecting the one or more target network entities comprises: selecting one or more geolocations for relaying the distance-based sidelink message based at least in part on a current geolocation of the UE, a distance within which the distance-based sidelink message is to be relayed, or both.

Aspect 8: The method of aspect 7, further comprising: determining a coverage map comprising geolocation information related to one or more geographic areas serviced by the serving network entity, the one or more target network entities, or both, wherein selecting the one or more geolocations is based at least in part on the coverage map.

Aspect 9: The method of any of aspects 1 through 8, wherein selecting the one or more target network entities comprises: determining one or more zone identifiers for one or more locations for relaying the distance-based sidelink message based at least in part on a zone identifier for the UE, wherein determining the one or more zone identifiers for one or more locations is based at least in part on a coverage map.

Aspect 10: The method of any of aspects 1 through 9, wherein transmitting the distance-based sidelink message comprises: transmitting the distance-based sidelink message to the one or more target network entities located in one or more locations associated with one or more zone identifiers.

Aspect 11: The method of any of aspects 1 through 10, wherein transmitting the distance-based sidelink message comprises: transmitting the distance-based sidelink message to the one or more target network entities, the distance-based sidelink message comprising a quality of service threshold for relay of the distance-based sidelink message to one or more UEs within the region of interest.

Aspect 12: A method for wireless communications at a target network entity, comprising: receiving, from a serving network entity and via a backhaul link, a distance-based sidelink message relayed from a UE, wherein the distance-based sidelink message is for relay of the distance-based sidelink message to one or more UEs within a region of interest; transmitting, to the one or more UEs and via an access link, a control message indicating the region of interest and a resource in which transmission of the distance-based sidelink message is scheduled; and transmitting, to the one or more UEs and via the access link, the distance-based sidelink message using the resource.

Aspect 13: The method of aspect 12, wherein transmitting the control message further comprises: transmitting the control message that is scrambled with a radio network temporary identifier that is associated with the region of interest.

Aspect 14: The method of any of aspects 12 through 13, wherein transmitting the control message comprises: transmitting the control message comprising an indication of a current geolocation of the UE.

Aspect 15: The method of any of aspects 12 through 14, wherein transmitting the control message comprises: transmitting the control message comprising an indication of a distance relative to a current geolocation of the UE, wherein the distance-based sidelink message is for relay to the one or more UEs within the distance.

Aspect 16: The method of any of aspects 12 through 15, wherein transmitting the distance-based sidelink message comprises: transmitting a physical downlink shared channel comprising the distance-based sidelink message using the resource.

Aspect 17: A method for wireless communications at a UE, comprising: receiving, from a target network entity and via an access link, a control message indicating a region of interest and a resource in which transmission of a distance-based sidelink message is scheduled, wherein the distance-based sidelink message is for relay of the distance-based sidelink message from a transmitting UE to one or more UEs within the region of interest; receiving, from the target network entity and via the access link, the distance-based sidelink message using the resource; and decoding the resource to identify the distance-based sidelink message based at least in part on the UE being located within the region of interest.

Aspect 18: The method of aspect 17, further comprising: receiving an indication of a radio network temporary identifier associated with the region of interest; and descrambling the control message using the radio network temporary identifier based at least in part on the UE being located within the region of interest.

Aspect 19: The method of any of aspects 17 through 18, further comprising: determining whether the UE is located within a distance relative to a current geolocation of the transmitting UE, wherein decoding the resource is based at least in part on the UE being located within the distance relative to the current geolocation of the transmitting UE.

Aspect 20: An apparatus for wireless communications at a serving network entity, comprising a memory, and one or more processors coupled to the memory, the one or more processors configured to cause the apparatus to perform a method of any of aspects 1 through 11.

Aspect 21: An apparatus for wireless communications at a serving network entity, comprising at least one means for performing a method of any of aspects 1 through 11.

Aspect 22: A non-transitory computer-readable medium storing code for wireless communications at a serving network entity, the code comprising instructions executable by one or more processors to perform a method of any of aspects 1 through 11.

Aspect 23: An apparatus for wireless communications at a target network entity, comprising a memory, and one or more processors coupled to the memory, the one or more processors configured to cause the apparatus to perform a method of any of aspects 12 through 16.

Aspect 24: An apparatus for wireless communications at a target network entity, comprising at least one means for performing a method of any of aspects 12 through 16.

Aspect 25: A non-transitory computer-readable medium storing code for wireless communications at a target network entity, the code comprising instructions executable by one or more processors to perform a method of any of aspects 12 through 16.

Aspect 26: An apparatus for wireless communications at a UE, comprising a memory, and one or more processors coupled to the memory, the one or more processors configured to cause the apparatus to perform a method of any of aspects 17 through 19.

Aspect 27: An apparatus for wireless communications at a UE, comprising at least one means for performing a method of any of aspects 17 through 19.

Aspect 28: A non-transitory computer-readable medium storing code for wireless communications at a UE, the code comprising instructions executable by one or more processors to perform a method of any of aspects 17 through 19.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" refers to any or all of the one or more components. For example, a component introduced with the article "a" shall be understood to mean "one or more components," and referring to "the component" subsequently in the claims shall be understood to be equivalent to referring to "at least one of the one or more components."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a serving network entity, comprising:

a memory; and one or more processors coupled to the memory, the one or more processors configured to:

receive, from a user equipment (UE) and via an access link, a distance-based sidelink message comprising an indication of a region of interest around the UE, wherein the distance-based sidelink message is for relay, via one or more target network entities, to one or more UEs within the region of interest;

select the one or more target network entities that provide service to at least a portion of the region of interest around the UE; and transmit, via a backhaul link, the distance-based sidelink message to the one or more target network entities for relay of the distance-based sidelink message to one or more UEs within the region of interest.

2. The apparatus of claim 1, wherein to receive the distance-based sidelink message the one or more processors are configured to:

receive the distance-based sidelink message comprising an indication of a distance relative to a geolocation of the UE, wherein the distance-based sidelink message is for relay to one or more UEs within the distance.

3. The apparatus of claim 1, wherein to receive the distance-based sidelink message the one or more processors are configured to:

receive the distance-based sidelink message comprising an indication of a quantity of one or more zones around the UE, wherein the distance-based sidelink message is for relay to one or more UEs within each zone of the quantity of one or more zones.

4. The apparatus of claim 1, wherein the one or more processors are configured to:

determine a current geolocation of the UE based at least in part on receiving the distance-based sidelink message, wherein selecting the one or more target network entities is based at least in part on the current geolocation of the UE.

5. The apparatus of claim 4, wherein to determine the current geolocation of the UE the one or more processors are configured to:

perform a positioning technique to determine the current geolocation of the UE, wherein the positioning technique comprises uplink positioning, downlink positioning, or both.

6. The apparatus of claim 4, wherein the one or more processors are configured to:

receive, from the UE, a control signal indicating a current zone of the UE, a determined geolocation of the UE, or both, wherein determining the current geolocation of the UE is based at least in part on receiving the control signal.

7. The apparatus of claim 1, wherein to select the one or more target network entities the one or more processors are configured to:
select one or more geolocations for relaying the distance-based sidelink message based at least in part on a current geolocation of the UE, a distance within which the distance-based sidelink message is to be relayed, or both.

8. The apparatus of claim 7, wherein the one or more processors are configured to:
determine a coverage map comprising geolocation information related to one or more geographic areas serviced by the serving network entity, the one or more target network entities, or both, wherein selecting the one or more geolocations is based at least in part on the coverage map.

9. The apparatus of claim 1, wherein to select the one or more target network entities the one or more processors are configured to:
determine one or more zone identifiers for one or more locations for relaying the distance-based sidelink message based at least in part on a zone identifier for the UE, wherein determining the one or more zone identifiers for one or more locations is based at least in part on a coverage map.

10. The apparatus of claim 1, wherein to transmit the distance-based sidelink message the one or more processors are configured to:
transmit the distance-based sidelink message to the one or more target network entities located in one or more locations associated with one or more zone identifiers.

11. The apparatus of claim 1, wherein to transmit the distance-based sidelink message the one or more processors are configured to:
transmit the distance-based sidelink message to the one or more target network entities, the distance-based sidelink message comprising a quality of service threshold for relay of the distance-based sidelink message to one or more UEs within the region of interest.

12. An apparatus for wireless communications at a target network entity, comprising:
a memory; and
one or more processors coupled to the memory, the one or more processors configured to:
receive, from a serving network entity and via a backhaul link, a distance-based sidelink message relayed from a UE, wherein the distance-based sidelink message is for relay of the distance-based sidelink message to one or more UEs within a region of interest;
transmit, to the one or more UEs and via an access link, a control message indicating the region of interest and a resource in which transmission of the distance-based sidelink message from the target network entity is scheduled; and
transmit, to the one or more UEs and via the access link, the distance-based sidelink message using the resource.

13. The apparatus of claim 12, wherein to transmit the control message the one or more processors are configured to:
transmit the control message that is scrambled with a radio network temporary identifier that is associated with the region of interest.

14. The apparatus of claim 12, wherein to transmit the control message the one or more processors are configured to:
transmit the control message comprising an indication of a current geolocation of the UE.

15. The apparatus of claim 12, wherein to transmit the control message the one or more processors are configured to:
transmit the control message comprising an indication of a distance relative to a current geolocation of the UE, wherein the distance-based sidelink message is for relay to the one or more UEs within the distance.

16. The apparatus of claim 12, wherein to transmit the distance-based sidelink message the one or more processors are configured to:
transmit a physical downlink shared channel comprising the distance-based sidelink message using the resource.

17. An apparatus for wireless communications at a user equipment (UE), comprising:
a memory; and
one or more processors coupled to the memory, the one or more processors configured to:
receive, from a target network entity and via an access link, a control message indicating a region of interest and a resource in which transmission of a distance-based sidelink message from the target network entity is scheduled, wherein the distance-based sidelink message is for relay of the distance-based sidelink message from a transmitting UE to one or more UEs within the region of interest;
receive, from the target network entity and via the access link, the distance-based sidelink message using the resource; and
decode the resource to identify the distance-based sidelink message based at least in part on the UE being located within the region of interest.

18. The apparatus of claim 17, wherein the one or more processors are configured to:
receive an indication of a radio network temporary identifier associated with the region of interest; and
descramble the control message using the radio network temporary identifier based at least in part on the UE being located within the region of interest.

19. The apparatus of claim 17, wherein the one or more processors are configured to:
determine whether the UE is located within a distance relative to a current geolocation of the transmitting UE, wherein decoding the resource is based at least in part on the UE being located within the distance relative to the current geolocation of the transmitting UE.

20. A method for wireless communications at a serving network entity, comprising:
receiving, from a user equipment (UE) and via an access link, a distance-based sidelink message comprising an indication of a region of interest around the UE, wherein the distance-based sidelink message is for relay, via one or more target network entities, to one or more UEs within the region of interest;
selecting the one or more target network entities that provide service to at least a portion of the region of interest around the UE; and
transmitting, via a backhaul link, the distance-based sidelink message to the one or more target network entities for relay of the distance-based sidelink message to one or more UEs within the region of interest.

21. The method of claim 20, wherein receiving the distance-based sidelink message comprises:

receiving the distance-based sidelink message comprising an indication of a distance relative to a geolocation of the UE, wherein the distance-based sidelink message is for relay to one or more UEs within the distance.

22. The method of claim 20, wherein receiving the distance-based sidelink message comprises:

receiving the distance-based sidelink message comprising an indication of a quantity of one or more zones around the UE, wherein the distance-based sidelink message is for relay to one or more UEs within each zone of the quantity of one or more zones.

23. The method of claim 20, further comprising:

determining a current geolocation of the UE based at least in part on receiving the distance-based sidelink message, wherein selecting the one or more target network entities is based at least in part on the current geolocation of the UE.

24. The method of claim 23, wherein determining the current geolocation of the UE comprises:

performing a positioning technique to determine the current geolocation of the UE, wherein the positioning technique comprises uplink positioning, downlink positioning, or both.

25. The method of claim 23, further comprising:

receiving, from the UE, a control signal indicating a current zone of the UE, a determined geolocation of the UE, or both, wherein determining the current geolocation of the UE is based at least in part on receiving the control signal.

26. The method of claim 20, wherein selecting the one or more target network entities comprises:

selecting one or more geolocations for relaying the distance-based sidelink message based at least in part on a current geolocation of the UE, a distance within which the distance-based sidelink message is to be relayed, or both.

27. The method of claim 26, further comprising:

determining a coverage map comprising geolocation information related to one or more geographic areas serviced by the serving network entity, the one or more target network entities, or both, wherein selecting the one or more geolocations is based at least in part on the coverage map.

28. The method of claim 20, wherein selecting the one or more target network entities comprises:

determining one or more zone identifiers for one or more locations for relaying the distance-based sidelink message based at least in part on a zone identifier for the UE, wherein determining the one or more zone identifiers for one or more locations is based at least in part on a coverage map.

29. The method of claim 20, wherein transmitting the distance-based sidelink message comprises:

transmitting the distance-based sidelink message to the one or more target network entities located in one or more locations associated with one or more zone identifiers.

30. The method of claim 20, wherein transmitting the distance-based sidelink message comprises:

transmitting the distance-based sidelink message to the one or more target network entities, the distance-based sidelink message comprising a quality of service threshold for relay of the distance-based sidelink message to one or more UEs within the region of interest.

* * * * *